(12) United States Patent
Kumar et al.

(10) Patent No.: US 11,284,240 B2
(45) Date of Patent: Mar. 22, 2022

(54) METHOD AND APPARATUS FOR MANAGING THE MOBILITY OF DEVICE IN A NETWORK

(71) Applicant: Samsung Electronics Co., Ltd., Suwon-si (KR)

(72) Inventors: Satish Kumar, Bangalore (IN); Sukhdeep Singh, Bangalore (IN); Suman Kumar, Bangalore (IN); Avinash Bhat, Bangalore (IN); Rahul Banerji, Bangalore (IN); Naman Gupta, Bangalore (IN); Seungil Yoon, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 8 days.

(21) Appl. No.: 16/813,146

(22) Filed: Mar. 9, 2020

(65) Prior Publication Data
US 2020/0296569 A1 Sep. 17, 2020

(30) Foreign Application Priority Data

Mar. 11, 2019 (IN) .............................. 201941009290
Oct. 29, 2019 (IN) ............................ 2019 41009290

(51) Int. Cl.
*H04W 4/00* (2018.01)
*H04W 8/02* (2009.01)
*H04W 64/00* (2009.01)
*H04W 8/22* (2009.01)

(52) U.S. Cl.
CPC ............... *H04W 8/02* (2013.01); *H04W 8/22* (2013.01); *H04W 64/00* (2013.01)

(58) Field of Classification Search
None
See application file for complete search history.

(56) References Cited

U.S. PATENT DOCUMENTS

| 2009/0274123 | A1 | 11/2009 | Chang et al. |
| 2017/0150415 | A1 | 5/2017 | Kapoulas et al. |
| 2017/0303180 | A1 | 10/2017 | Kapoulas et al. |
| 2018/0317163 | A1* | 11/2018 | Lee ..................... H04W 48/18 |
| 2019/0028943 | A1 | 1/2019 | Wang et al. |

(Continued)

OTHER PUBLICATIONS

International Search Report dated Jun. 16, 2020, issued in an International Application No. PCT/KR2020/003238.

(Continued)

*Primary Examiner* — Suhail Khan
(74) *Attorney, Agent, or Firm* — Jefferson IP Law, LLP

(57) ABSTRACT

A method and Network function for controlling an operation of a device based on a service provided to the device is provided. The method includes obtaining at least one of information about the service requested by the device, movement information of the device, or capability information of the device, determining a characteristic of the service provided to the device based on at least one of the information about the service, the movement information of the device, or the capability information of the device, generating service setting information for the service provided to the device based on the determined characteristic of the service, and transmitting, to an Access and Mobility Function (AMF), the service setting information.

16 Claims, 18 Drawing Sheets

(56) References Cited

U.S. PATENT DOCUMENTS

| | | | |
|---|---|---|---|
| 2019/0098569 A1 | 3/2019 | Hou et al. | |
| 2020/0059989 A1* | 2/2020 | Velev | H04W 36/12 |
| 2020/0170052 A1* | 5/2020 | Yang | H04W 28/26 |
| 2021/0204207 A1* | 7/2021 | Fiorese | H04W 8/08 |

OTHER PUBLICATIONS

3rd Generation Partnership Project; Technical Specification Group Core Network and Terminals; 5G System; Access and Mobility Policy Control Service; 3GPP TS 29.507 V15.2.0; Stage 3 (Release 15); Dec. 2018.

3rd Generation Partnership Project; Technical Specification Group Services and System Aspects; Procedures for the 5G System; 3GPP TS 23.502 V15.4.1; Stage 2 (Release 15); Jan. 2019.

Kumar et al.; MAS5G: Move Around Smartly in 5G; Mar. 28, 2020.

F. Z. Yousaf et al., Network Slicing with Flexible Mobility and QoS/QoE Support for 5G Networks, 2017 IEEE International Conference On Communications Workshops (ICC Workshops), Paris, 2017, pp. 1195-1201.

P. Fan, J. Zhao, and C. I, 5G High Mobility Wireless Communications: Challenges and Solutions, in China Communications, 2016, vol. 13, No. 2, pp. 1-13.

R. Wen, G. Feng, J. Zhou, and S. Qin, Mobility Management for Network Slicing Based 5G Networks, 2018 18th IEEE International Conference on Communication Technology (ICCT), Chongqing, 2018, pp. 291-296.

3rd Generation Partnership Project; Technical Specification Group Services and System Aspects; System Architecture for the 5G System; Stage 2 (Release 15), 3GPP TS 23.501 V15.0.0, Dec. 2017, Section 5.15.2, Valbonne, France.

3rd Generation Partnership Project; Technical Specification Group Radio Access Network; NG-RAN; NG Application Protocol (NGAP) (Release 15), 3GPP TS 38.413 V15.2.0, Dec. 2018, Valbonne, France.

* cited by examiner

FIG. 10

| 3 Proposed URLLC Schema |
|---|
| 1: Service Type: URLLC |
| 2: supportedFeatures: URLLC features (Beam Tracking, beam management, etc.) |
| 3: EPS Attach: Attach with IP |
| 4: RAT-Type supported: NR |
| 5: serviceAreaRestrictions: virtual TAL (relation between TAL1, TAL2, TAL3... enroute) |
| 6: RfspIndex: n78 |
| 7: Preferred Neighbour List: Dynamic preferred NL (to avoid measurement event) |
| 8: Optional parameters as system & application function requires |

FIG. 12

| 2 Proposed mMTC Schema |
|---|
| 1: Service Type: mMTC |
| 2: supportedFeatures: mMTC features (PSM, DRX, SISO, Coverage Extension, Event based Paging, Rate control) |
| 3: EPS Attach: Attach without IP |
| 4: RAT-Type supported: NR |
| 5: serviceAreaRestrictions: TA1 |
| 6: RfspIndex: n5, n8 |
| 7: Preferred Neighbour List: N1, N2, N3, N4 |
| 8: Optional parameters as system & application function requires |

METHOD AND APPARATUS FOR MANAGING THE MOBILITY OF DEVICE IN A NETWORK

CROSS-REFERENCE TO RELATED APPLICATION(S)

This application is based on and claims priority under 35 U.S.C. § 119(a) of an Indian provisional application number 201941009290, filed on Mar. 11, 2019, in the Indian Patent Office and of an Indian complete application number 201941009290, filed on Oct. 29, 2019, in the Indian Patent Office, the disclosure of each of which is incorporated by reference herein in its entirety.

BACKGROUND

1. Field

The disclosure relates to 5$^{th}$ Generation (5G) communication networks. More particularly, the disclosure relates to methods and systems for managing mobility of devices in 5G communication networks based on type of service(s) that can be availed or are being availed by the devices.

2. Description of Related Art

To meet the demand for wireless data traffic having increased since deployment of 4th generation (4G) communication systems, efforts have been made to develop an improved 5th generation (5G) or pre-5G communication system. The 5G or pre-5G communication system is also called a 'beyond 4G network' or a 'post long term evolution (LTE) system'. The 5G communication system is considered to be implemented in higher frequency (mmWave) bands, e.g., 60 gigahertz (GHz) bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beamforming, and large scale antenna techniques are discussed with respect to 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

In the 5G system, hybrid frequency shift keying (FSK) and quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies, such as a sensor network, MTC, and M2M communication may be implemented by beamforming, MIMO, and array antennas. Application of a cloud RAN as the above-described big data processing technology may also be considered to be as an example of convergence between the 5G technology and the IoT technology.

As described above, various services can be provided according to the development of a wireless communication system, and thus a method for easily providing such services is required.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide methods and systems for managing mobility procedures for devices in 5th Generation (5G) communication networks based on type of service availed by the devices. The embodiments include differentiating different types of 5G services, wherein the differentiation comprises identifying appropriate mobility policies for each of the different types of 5G services. The embodiments include creating mobility schemas corresponding to each of the different types of 5G services based on capability of the devices and Network Slice Selection Assistance Information (NSSAI) information, wherein the mobility schemas include guidelines that govern the mobility procedures for the devices that are availing the of 5G services, through different network slices, that correspond with the mobility schemas.

Additional aspects will be set forth in part in the description which follows and, in part, will be apparent from the description, or may be learned by practice of the presented embodiments.

These and other aspects of the embodiments herein will be better appreciated and understood when considered in conjunction with the following description and the accompanying drawings. It should be understood, however, that the following descriptions, while indicating embodiments and numerous specific details thereof, are given by way of illustration and not of limitation. Many changes and modifications may be made within the scope of the embodiments herein without departing from the spirit thereof, and the embodiments herein include all such modifications.

In accordance with an aspect of the disclosure, a method for managing mobility of devices availing 5th Generation (5G) services is provided. The method includes creating, by a Central Mobility Manager (CMM) (200), a plurality of mobility schemas, wherein each of the plurality of mobility schemas correspond to each of a plurality of 5G services provided through a plurality of network slices, sending, by the CMM (200), the plurality of mobility schemas to a 5G Random Access Network (RAN) (202), and managing, by at least one of the 5G RAN (202) and a plurality of devices, at least one mobility procedure based on the plurality of mobility schemas.

In an embodiment of the disclosure, wherein each of the plurality of mobility schemas comprises of guidelines for managing the at least one mobility procedure carried out at each of the plurality of devices availing the plurality of 5G services.

In an embodiment of the disclosure, wherein the plurality of mobility schemas are sent to the 5G RAN (202) through an Access and Mobility Function (AMF) (201), wherein the AMF (201) delivers the plurality of mobility schemas to the 5G RAN (202) by a private message mechanism.

In an embodiment of the disclosure, wherein the at least one mobility procedure comprises of cell reselection, cell redirection, neighboring signal cell measurement event, location update, carrier aggregation, Wireless Fidelity (Wi-Fi) aggregation, and handover.

In an embodiment of the disclosure, wherein the guidelines included in each of the plurality of mobility schemas comprises at least one of permission to perform the at least one mobility procedure, allowed frequencies, list of Tracking Areas (TAs) from which the plurality of devices avails the plurality of 5G services, list of preferred cells acting as neighboring cells, and type of Radio Access Technologies (RATs) to latch.

In an embodiment of the disclosure, wherein resources to perform the at least one mobility procedure are segregated, by the CMM (200), amongst the plurality of network slices, wherein each of the plurality of devices availing the plurality of 5G services is identified based on network slice identities associated with the plurality of network slices through which the plurality of 5G services are provided.

In an embodiment of the disclosure, wherein the plurality of mobility schemas are one of created and dynamically updated, by the CMM (200), based on capabilities of the plurality of devices and Network Slice Selection and Assistance Information (NSSAI) provided by the AMF (201), wherein the guidelines included in the plurality of mobility schemas are updated based on requirements of the plurality of 5G services availed by the plurality of devices.

In an embodiment of the disclosure, wherein each of the plurality of devices indicate intentions to avail the plurality of 5G services to the 5G RAN (202) in registration request messages, wherein the registration request messages include the capabilities of the plurality of devices.

In accordance with another aspect of the disclosure, a method for managing mobility of devices availing 5th Generation (5G) services is provided. The method includes differentiating, by a Central Mobility Manager (CMM) (200), in a 5G network, a plurality of 5G services based on management of mobility procedures of devices availing the plurality of 5G services, creating, by the CMM (200), a plurality of mobility schemas for managing the mobility procedures of the devices availing the plurality of 5G services, wherein the plurality of mobility schemas are based on capabilities of the devices and a plurality of network slices through which the plurality of 5G services are provided, and sending, by the CMM (200), the plurality of mobility schemas to a 5G Random Access Network (RAN) (202) through an Access and Mobility Function (AMF) (201) by a private message mechanism.

In an embodiment of the disclosure, wherein the mobility procedures comprise of cell reselection, cell redirection, neighboring signal cell measurement event, location update, carrier aggregation, Wireless Fidelity (Wi-Fi) aggregation, and handover.

In an embodiment of the disclosure, wherein the plurality of mobility schemas are created and dynamically updated, by the CMM (200), based on the capabilities of the devices and Network Slice Selection and Assistance Information (NSSAI) provided by the AMF (201), wherein the plurality of mobility schemas are updated based on requirements of the plurality of 5G services availed by the devices.

In an embodiment of the disclosure, A Central Mobility Manager (CMM) (200) for managing mobility of devices availing 5th Generation (5G) services, the CMM (200) configured to create a plurality of mobility schemas, wherein each of the plurality of mobility schemas correspond to each of a plurality of 5G services provided through a plurality of network slices, send the plurality of mobility schemas to a 5G Random Access Network (RAN) (202), and manage, by at least one of the a 5G RAN (202) and a plurality of devices, at least one mobility procedure based on the plurality of mobility schemas.

In an embodiment of the disclosure, wherein each of the plurality of mobility schemas comprises of guidelines for managing the at least one mobility procedure carried out at each of the plurality of devices availing the plurality of 5G services.

In an embodiment of the disclosure, wherein the plurality of mobility schemas are sent to the 5G RAN (202) through an Access and Mobility Function (AMF) (201), wherein the AMF (201) delivers the plurality of mobility schemas to the 5G RAN (202) by a private message mechanism 208.

In an embodiment of the disclosure, wherein the at least one mobility procedure comprises of cell reselection, cell redirection, neighboring signal cell measurement event, location update, carrier aggregation, Wireless Fidelity (Wi-Fi) aggregation, and handover.

In an embodiment of the disclosure, wherein the guidelines included in each of the plurality of mobility schemas comprises at least one of permission to perform the at least one mobility procedure, allowed frequencies, list of Tracking Areas (TAs) from which the plurality of devices avails the plurality of 5G services, list of preferred cells acting as neighboring cells, and type of Radio Access Technologies (RATs) to latch.

In an embodiment of the disclosure, wherein resources to perform the at least one mobility procedure are segregated, by the CMM (200), amongst the plurality of network slices, wherein each of the plurality of devices availing the plurality of 5G services is identified based on network slice identities associated with the plurality of network slices through which the plurality of 5G services are provided.

In an embodiment of the disclosure, wherein the plurality of mobility schemas are one of created and dynamically updated, by the CMM (200), based on capabilities of the plurality of devices and Network Slice Selection and Assistance Information (NSSAI) provided by the AMF (201), wherein the guidelines included in the plurality of mobility schemas are updated based on requirements of the plurality of 5G services availed by the plurality of devices.

In an embodiment of the disclosure, wherein each of the plurality of devices indicate intentions to avail the plurality of 5G services to the 5G RAN (202) in registration request messages, wherein the registration request messages include the capabilities of the plurality of devices.

In an embodiment of the disclosure, a Central Mobility Manager (CMM) (200), in a 5th Generation (5G) network, for managing mobility of devices availing 5G services, the CMM (200) configured to differentiate a plurality of 5G services based on management of mobility procedures of devices availing the plurality of 5G services, create a plurality of mobility schemas for managing the mobility procedures of the devices availing the plurality of 5G services, wherein the plurality of mobility schemas are based on capabilities of the devices and a plurality of network slices through which the plurality of 5G services are provided, and send the plurality of mobility schemas to a 5G Random Access Network (RAN) (202) through an Access and Mobility Function (AMF) (201) by a private message mechanism 207.

In an embodiment of the disclosure, wherein the mobility procedures comprise of cell reselection, cell redirection, neighboring signal cell measurement event, location update, carrier aggregation, Wireless Fidelity (Wi-Fi) aggregation, and handover.

In an embodiment of the disclosure, wherein the plurality of mobility schemas are created and dynamically updated, by the CMM (200), based on the capabilities of the devices and Network Slice Selection and Assistance Information (NSSAI) provided by the AMF (201), wherein the plurality of mobility schemas are updated based on requirements of the plurality of 5G services availed by the devices.

In an embodiment of the disclosure, a device for performing mobility procedures in 5th Generation (5G) systems based on mobility schemas, the device configured to receive a plurality of mobility schemas created by a Central Mobility Manager (CMM) (200), wherein each of the plurality of mobility schemas correspond to each of a plurality of 5G services provided through a plurality of network slices, wherein, the plurality of mobility schemas are received through a 5G Random Access Network (RAN) (202), and managing, by at least one of the 5G RAN (202) and the device, at least one mobility procedure performed by the device based on the plurality of mobility schemas.

In an embodiment of the disclosure, wherein each of the plurality of mobility schemas comprises of guidelines for managing the at least one mobility procedure performed by the device availing the plurality of 5G services.

In an embodiment of the disclosure, wherein the at least one mobility procedure comprises of cell reselection, cell redirection, neighboring signal cell measurement event, location update, carrier aggregation, Wireless Fidelity (Wi-Fi) aggregation, and handover.

In an embodiment of the disclosure, wherein the guidelines included in each of the plurality of mobility schemas comprises at least one of permission to perform the at least one mobility procedure, allowed frequencies, list of Tracking Areas (TAs) from which the plurality of devices avails the plurality of 5G services, list of preferred cells acting as neighboring cells, and type of Radio Access Technologies (RATs) to latch.

Before undertaking the detailed description below, it may be advantageous to set forth definitions of certain words and phrases used throughout this patent document the terms "include" and "comprise," as well as derivatives thereof, mean inclusion without limitation, the term "or," is inclusive, meaning and/or, the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like, and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 10 illustrates a mobility schema of a device based on a URLLC service according to an embodiment of the disclosure;

FIG. 12 illustrates a mobility schema of a device based on a mMTC service according to an embodiment of the disclosure;

Throughout the drawings, like reference numerals will be understood to refer to like parts, components, and structures.

DETAILED DESCRIPTION

Figure 1:
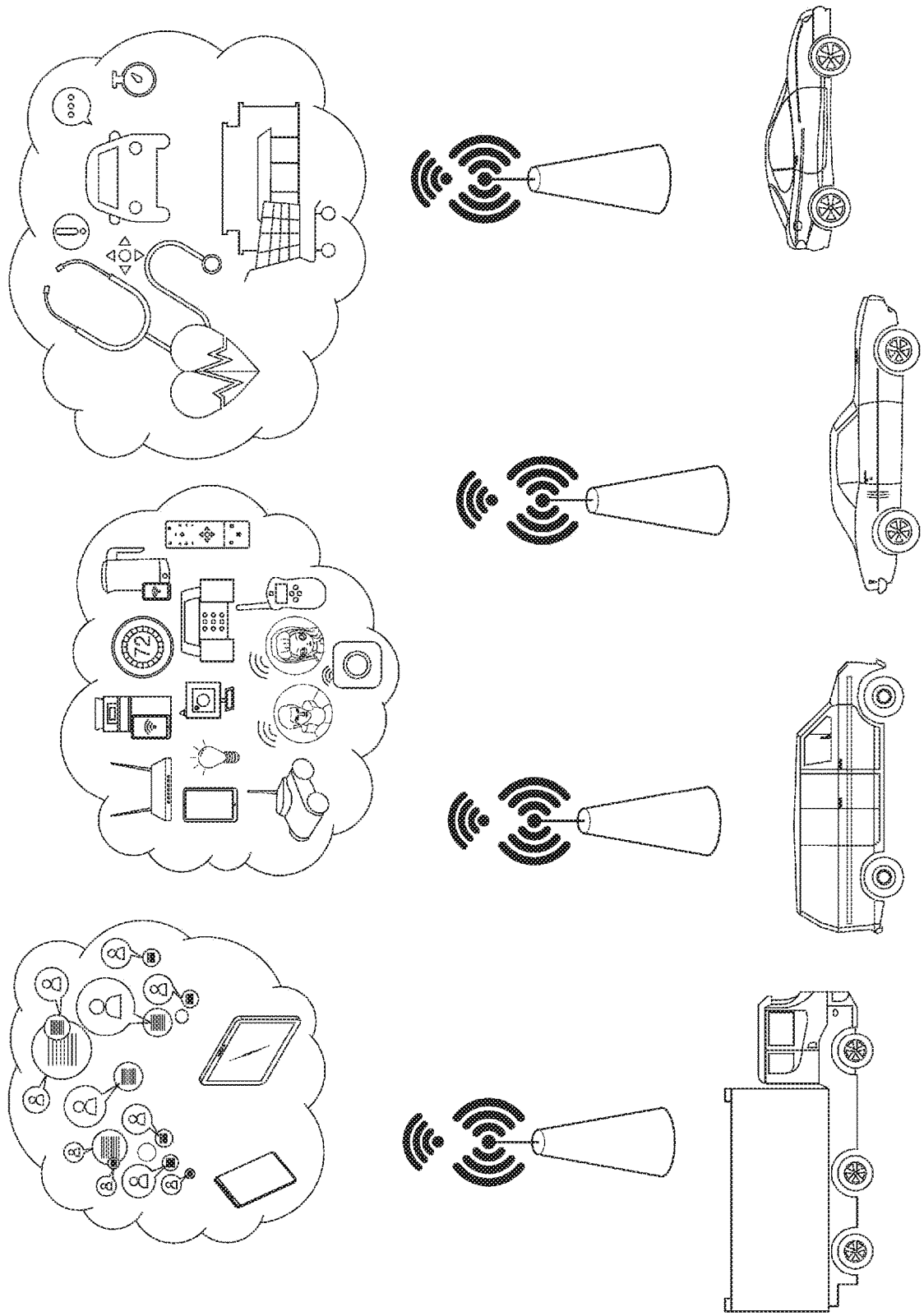
FIG. 1 depicts a 5th Generation (5G) network providing a plurality of services to a plurality of devices according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Embodiments herein disclose methods and systems for managing mobility of devices in $5^{th}$ Generation (5G) networks based on type of services availed by the devices. The embodiments include managing the mobility of devices by controlling mobility procedures, such as, but not limited to, initial access (reselection, redirection), Wireless-Fidelity (Wi-Fi) aggregation, handover, carrier aggregation, location update, and so on, based on the type of 5G service availed by the devices. Examples of the types of 5G service can be, but not limited to, enhanced Mobile Broadband (eMBB) service, Ultra Reliable Low Latency Communication (URLLC) service, and massive Machine Type Communication (mMTC) service.

$5^{th}$ Generation (5G) communication networks support network slicing, wherein different types of 5G services can be provided using different network slices comprising of logical interfaces. Network slicing enables the 5G communication networks to support diverse 5G services using a common/shared physical network.

The 5G services can be categorized into enhanced Mobile Broadband (eMBB), massive Machine Type Communication (mMTC) and Ultra Reliable Low Latency Communications (URLLC). Each of the service types can have specific requirements for enablement, which are catered to by the 5G networks. Network slicing allows multiple logical networks to run on top of a shared physical network. It creates an end-to-end isolated network with all virtualized access, transport and core network components for end users. This allows optimal sharing of common physical resources and maximizes the network resource utilization. The flexibility provided by network slicing can improve management of mobility parameters for the devices availing the 5G services.

As the cell size in 5G networks is small, there can be frequent handover procedures. The handover procedures are likely to contribute to an increased control signaling overhead in the 5G network.

Besides, if the 5G networks comprise of a large number of nodes (devices), there can be challenges in reducing the signaling overhead. Moreover, in ultra-dense networks, the number of handovers is likely to be high, which may result in an unsatisfactory user experience. Therefore, the signaling overhead that is required to be handled by the 5G networks can cause congestion in the 5G networks leading to minimization of efficiency of spectral usage of the 5G networks, wherein spectral resources may be underutilized, and/or improperly distributed.

The embodiments include differentiating different types of 5G services, wherein the differentiation comprises identifying appropriate mobility policies for each of the different types of 5G services. The embodiments include creating dedicated mobility schemas corresponding to each of the different types of 5G services based on capability of the devices and Network Slice Selection Assistance Information (NSSAI) information, wherein the mobility schemas include guidelines that govern the mobility procedures for the devices that are availing the of 5G services through different network slices that correspond with the mobility schemas.

The mobility schemas can be associated with network slices through which the 5G services are provided. In an example, consider that the 5G network offers eMBB, URLLC and mMTC services, then the mobility schemas can be referred to as the eMBB, URLLC and mMTC schemas. The mobility schemas can be further divided based on operator specific business use cases. The mobility schemas can include specific network functions that enable the management of mobility procedures of the devices availing the respective services. The mobility schemas can be derived based on NSSAI, device capability and subscriber policy. The mobility of each of the devices availing the 5G services can be managed by one of the mobility schemas associated with the 5G services. The embodiments include preventing frequent network signaling and resource negotiation caused due to mobility of devices in the network. The embodiments allow a 5G Radio Access Network (RAN) to segregate and distribute user access request (to avail a particular 5G service) and radio resources efficiently by determining the service requirements of the devices.

Referring now to the drawings, and more particularly to FIGS. 1 to 10, 11A and 11B, 12, 13A to 13C, 14, and 15, where similar reference characters denote corresponding features consistently throughout the figures, there are shown preferred embodiments.

$5^{th}$ Generation (5G) communication networks support network slicing, wherein different types of 5G services can be provided using different network slices comprising of logical interfaces. Network slicing enables the 5G communication networks to support diverse 5G services using a common/shared physical network. The 5G services can be categorized into enhanced Mobile Broadband (eMBB), massive Machine Type Communication (mMTC) and Ultra Reliable Low Latency Communications (URLLC). Each of the service types can have specific requirements for enablement, which are catered to by the 5G networks. Network slicing allows multiple logical networks to run on top of a shared physical network. It creates an end-to-end isolated network with all virtualized access, transport and core network components for end users. This allows optimal sharing of common physical resources and maximizes the network resource utilization. The flexibility provided by network slicing can improve management of mobility parameters for the devices availing the 5G services.

As the cell size in 5G networks is small, there can be frequent handover procedures. The handover procedures are likely to contribute to an increased control signaling overhead in the 5G network.

Besides, if the 5G networks comprise of a large number of nodes (devices), there can be challenges in reducing the signaling overhead. Moreover, in ultra-dense networks, the number of handovers is likely to be high, which may result in an unsatisfactory user experience. Therefore, the signaling overhead that is required to be handled by the 5G networks can cause congestion in the 5G networks leading to minimization of efficiency of spectral usage of the 5G networks, wherein spectral resources may be underutilized, and/or improperly distributed.

FIG. 1 depicts a 5G network providing a plurality of services to a plurality of devices according to an embodiment of the disclosure.

Referring to FIG. 1, the 5G network includes different types of devices receiving different types of 5G services from the 5G network. Mobility management is one of the critical functions of the 5G network, which can affect the efficiency of the 5G network, as resources available are limited and mobility procedures incur latency in 5G network. The requirements of different types of 5G services can be different and the mobility procedures performed at the devices availing the 5G services can differ. In an example, if a vehicle is availing a Vehicle to Everything (V2X) service and the vehicle is moving, many handovers could be triggered at high speed within a short period of time. For devices, with low or no mobility, reliable and/or low-latency communications needs to be guaranteed. The devices availing eMBB services may search for cells/RATs providing greater bandwidth.

The degree of mobility of each of the plurality of devices in the 5G network can differ. For example: mobility of an Internet of Things (IoT) device availing the eMBB service in an indoor environment is different from that of a vehicle availing V2X service, when the vehicle is moving. In another example, a static IoT device, availing the eMBB service, may not require a handover, whereas a device, availing URLLC service, may require a priority handover, since enablement of URLLC service requires having low latency and high bandwidth. The mobility parameters (such as support for different types of Radio Access Technologies (RATs), preferred roaming list, RAT Frequency Selection Priority (RFSP) index, preferred roaming list, and so on) and rules that govern the mobility procedures for all devices, availing different types of services, are the same. In Packet Switch (PS) mode, the mobility parameters are common for all of the plurality of devices, irrespective of the service(s) availed.

The 5G network may simultaneously support a plurality of RATs in a particular area. If there is an overlap between service areas of multiple RATs, the devices are likely to frequently switch between the RATs in order to maintain seamless service, which in turn can lead to signaling overhead. Frequent switching across different networks RATs can also lead to congestion in the 5G networks. The delay and jitter experienced by a particular device, bandwidth provided to the device, and so on, can vary depending on the relative position of the device and components of the network. Maintaining a stable Quality of Service (QoS) and Quality of Experience (QoE) in such circumstances can be challenging.

The principal object of the embodiments herein is to disclose methods and systems for managing mobility of devices in 5G communication networks based on the type of 5G service(s) availed by the devices, wherein the management comprises of controlling mobility procedures of the devices based on the type of 5G service(s) availed by the devices.

Another object of the embodiments herein is to provide a Central Mobility Manager (CMM) for differentiating different types of 5G services, wherein the differentiation comprises identifying appropriate mobility policies for devices based on the type of 5G service(s) being used.

Another object of the embodiments herein is to provide dedicated mobility schemas for each of the different types of 5G services based on device capability and Network Slice Selection Assistance Information (NSSAI), wherein the mobility schemas govern mobility procedures for the devices availing different types of 5G services through different network slices.

Another object of the embodiments herein is to restrict cell switching and segregate resources amongst network slices to minimize frequent handover procedures, ensure proper utilization of resources and reduce contention among devices for resources.

Figure 2:
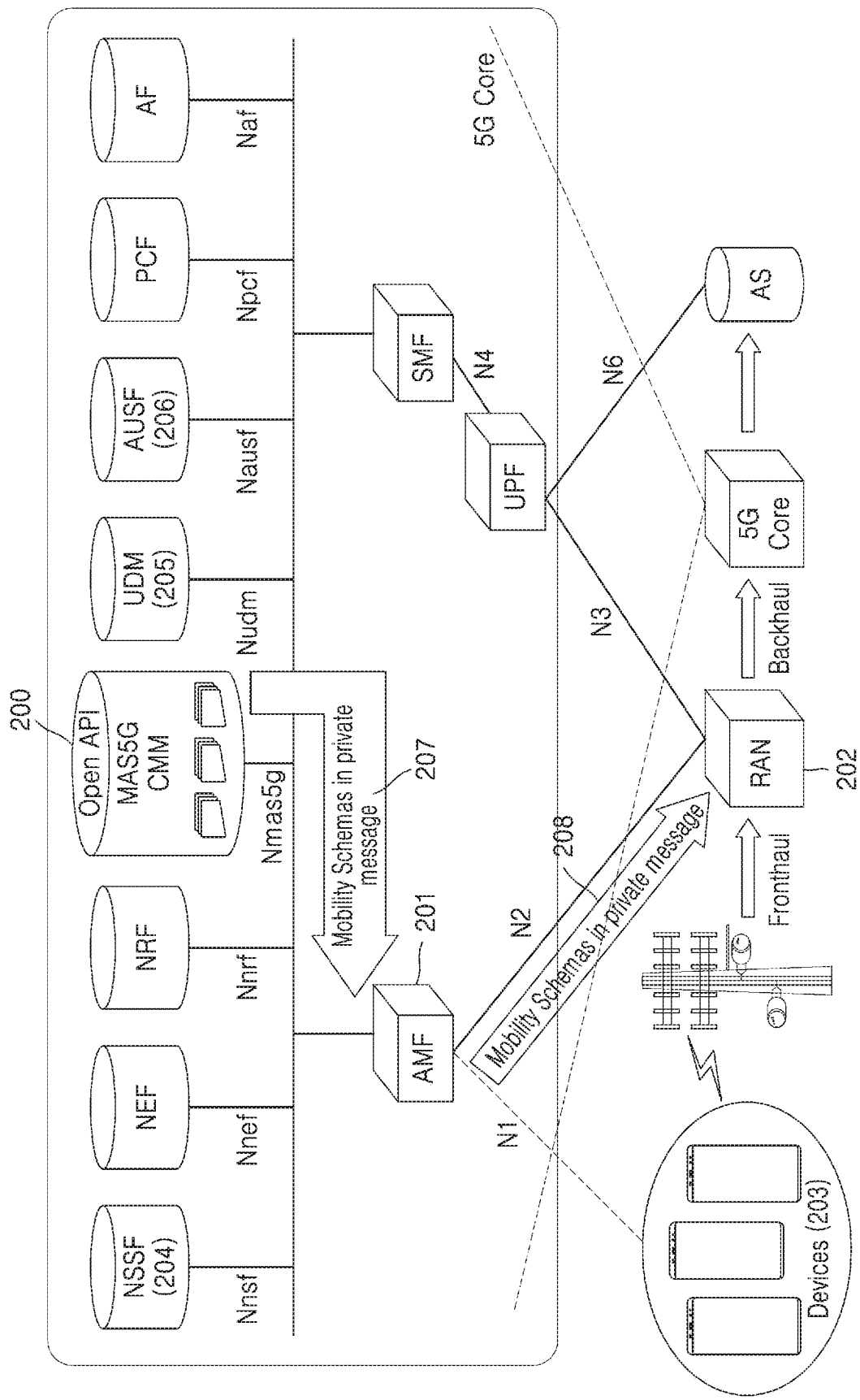
FIG. 2 depicts an architecture of a 5G communication system including a Central Mobility Manager (CMM) according to an embodiment of the disclosure.

FIG. 2 depicts an architecture of a 5G communication system including a Central Mobility Manager (CMM) according to an embodiment of the disclosure.

Referring to FIG. 2, a CMM 200 can be a logical node for managing mobility of a device. In addition, the CMM can be a network function (or entity). The CMM 200 also can belong to the core network. The CMM is an example for referring to the node for managing mobility of the device, and is not limited to the term.

The CMM 200 can be configured to manage mobility of devices based on type of 5G services that are being availed by the devices. Examples of the devices can be, but not limited to, a mobile phone, a smart phone, an Internet of Things (IoT) device, a laptop, a Personal Computer (PC), a vehicle, a wearable device, and so on. The types of 5G services that can be availed by the devices can be categorized into one or more services. In an example herein, the types of 5G services that can be availed by the devices can be categorized as eMBB services, mMTC services, URLLC services, and so on. The devices can avail a particular type of 5G service through a particular network slice.

The CMM 200 can differentiate the different types of 5G services and identify mobility policies for each of the types of 5G services. The devices availing different types of 5G services can be differentiated based on network slice identity, which is assigned to the devices availing services that are provided through the respective network slices. The CMM 200 can create mobility schemas for each type of 5G service. The mobility schemas can be created based on device capabilities and NSSAI information.

The mobility procedures of the devices availing a particular 5G service are governed by the mobility schema created for the particular 5G service. Examples of the mobility procedures governed by the mobility schemas can be, but not limited to, cell reselection, cell redirection, carrier aggregation, Wi-Fi aggregation, location update, handover, and so on. The CMM 200 can segregate network resources amongst different network slices for efficient resource utilization. The CMM 200 allows dynamic update of the mobility schemas based on the device capability and NSSAI.

The mobility schemas define a plurality of features, such as, but not limited to, at least one of features that the devices can support during the mobility procedure, type of Radio Access Technologies (RATs) the devices can latch to; preferred roaming list, service area restrictions, allowed frequencies, preferred neighbor list, and so on. The mobility schemas can restrict frequent cell switching, thereby minimizing the number of handovers. Minimization of the number of handover procedures can allow saving radio resources that would had been otherwise wasted due to unnecessary handovers, and curtail signaling messages. Restriction of cell switching can prevent unnecessary contention among devices for radio resources. As the resources are segregated across the network slices, the contention for the resources is amongst devices within a particular network slice. This can keep congestion in the 5G network under control. The CMM 200 can deliver the mobility schemas to the Access and Mobility Function (AMF) 201. The AMF 201 can provide the mobility schemas to the 5G RAN 202 using a private message mechanism (as described in the 3$^{rd}$ Generation Partnership Project (3GPP) specification).

In an example, consider a device is availing the mMTC service. The device can be identified based on an identity of a network slice through which the mMTC service is being provided. The CMM 200 can create a mobility schema, which can manage the mobility procedures of the device availing the mMTC service.

As network resources are split amongst the network slices providing the 5G services, Random Access Channel (RACH) resources can be segregated across the network slices. The RACH resources allocated to the mMTC slice can be availed amongst devices intending to avail the mMTC service. The devices can be scheduled to utilize the RACH resources using a scheduling mechanism, such as a round robin mechanism, a best effort mechanism, and so on. This can reduce contention from devices availing other 5G services through other network slices contesting for RACH resources.

Consider that the device availing the mMTC service is an IoT device. The CMM 200 can fetch the location of the IoT device (based on the location of the IoT device in previous sessions) and modify the mobility schema based on capability of the IoT device.

The CMM 200 can provide the mMTC network slice schema to build the IoT device context at the core network and the 5G RAN 202. The IoT device context can be built using network slice selection response to the AMF 201 through the Network Slice Selection Function (NSSF). The IoT device in the mMTC network slice is likely to be stationary with limited scope of location update. The mobility schema allows the IoT device to update its location by switching to a cell that is one amongst a preferred Tracking Area (TA) list. This can avoid frequent updates in the TA, hereby optimizing the paging process. The mMTC mobility schema can reduce the size of messages by avoiding attributes related to services mentioned in 3GPP specifications. Non Internet Protocol (IP) Data Delivery (NIDD) devices can piggyback information in reserved or unused bits in the signaling messages. For example, the mMTC mobility schema allows the devices availing the mMTC service to perform reselection or redirection. The mMTC mobility schema may not allow the devices to perform neighboring cell signaling measurement for handover and carrier aggregation.

In an example, consider a device is availing URLLC service. The device can be identified based on an identity of a network slice through which the URLLC service is being provided. The CMM 200 can create a mobility schema, which can manage the mobility procedures of the device availing the URLLC service.

The RACH resources allocated to the URLLC slice can be availed amongst devices intending to avail the URLLC service. The devices can be scheduled to utilize the RACH resources using a scheduling mechanism, such as a round robin mechanism, a best effort mechanism, and so on. This can reduce contention from devices availing other 5G services through other network slices contesting for RACH resources.

Consider that the device availing the URLLC service is a vehicle. If a user of the vehicle defines a route of travel, the source and destination can be known prior to the start of journey. The CMM 200 can obtain real time location coordinates of the vehicle, which can be polled by a Location-based Server (LBS) while availing the Vehicle-to-Everything (V2X) service. The CMM 200 can also obtain additional parameters, such as cell ID, TA, frequency of radio nodes (base stations) in the network, and so on.

The CMM 200 can provide the URLLC network slice schema to build the vehicle context at the core network and the 5G RAN 202. The CMM 200 can provide a TA list and a preferred neighbor list based on the suggested route and location, and the radiation pattern of radio cells to the 5G RAN 202. If a location update needs to be performed, cell reselection or handover can be performed amongst cells in the TA list and the preferred neighbor list. This can usage of resources for paging and providing location updates. The URLLC mobility schema can choose cells as candidate cells to be a part of the TA list and the preferred neighbor list if the candidate cells fall in the driving route. This can reduce the handover failures and optimize the handover latencies. The cells in the preferred neighbor list can be chosen based on parameters, such as, but not limited to, analytics of cell distance, direction of driving, in-band interference, resource load, and so on. The neighboring relation (amongst cells) can be established by considering parameters, such as, but not limited to, intra-band, inter-band, and inter RAT cells according to mapped mobility schema.

In an example, consider a device is availing eMBB service. The device can be identified based on an identity of a network slice through which the eMBB service is being provided.

The CMM 200 can create a mobility schema, which can manage the mobility procedures of the device availing the eMBB service. The device can access RACH resources, allocated to the eMBB slice, randomly. The device can be scheduled to utilize the RACH resources using a best effort mechanism. The segregation of resources amongst the network slices allows minimizing resource contention amongst devices availing the eMBB service through the network slice providing the eMBB service. The segregation of resources also prevents wastage of resources due to high mobility of the devices availing the eMBB services.

The CMM 200 can create a dynamic mobility schema to govern the mobility procedures of the devices availing the eMBB service based on analytics of neighboring cell signal measurement and device capability. Consider that the device is a UE. The UE, availing the eMBB service can update its location as per rules designed by the 5G network. The eMBB mobility schema may not provide a preferred TA list. The CMM 200 can allow mobility procedures, such as, but not limited to, reselection, redirection, handover, carrier aggregation, Wi-Fi aggregation and so on. The UE/5G network can select a neighboring cell based on signal measurements and perform handover, aggregation, and so on.

Figure 3:
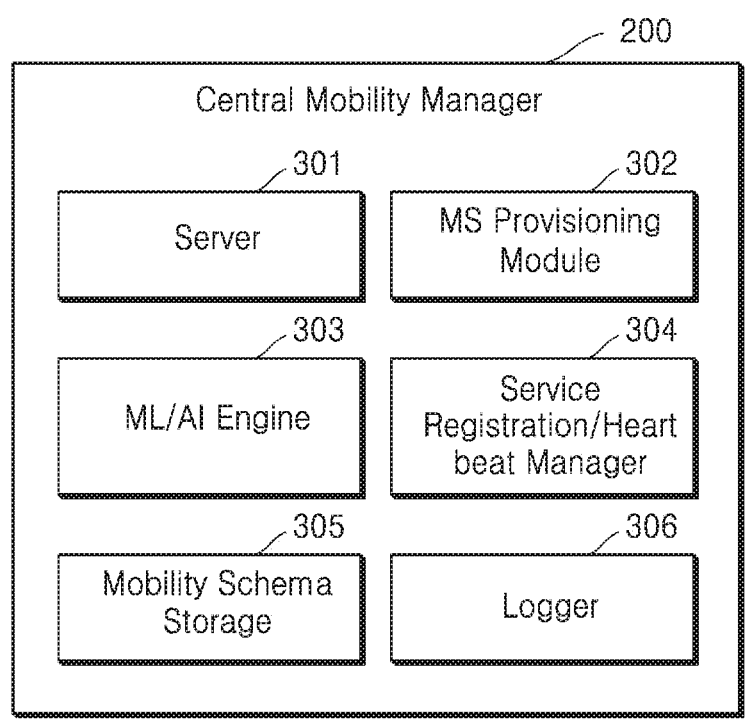
FIG. 3 depicts various units of a CMM configured to manage mobility procedures for devices availing different types of 5G services according to an embodiment of the disclosure.

FIG. 3 depicts various units of a CMM configured to manage mobility procedures for devices availing different types of 5G services according to an embodiment of the disclosure.

Referring to FIG. 3, the CMM 200 comprises of a server 301, a Mobility Schema (MS) provisioning module 302, a Machine Learning/Artificial Intelligence (ML/AI) engine 303, a service registration/Heartbeat manager 304, a mobility schema storage 305, and a logger 306.

In an embodiment of the disclosure, the server 301 can be a Hyper Text Transfer Protocol (HTTP) server. The server 301 can receive requests from device(s) for availing the 5G services. The server 301 can respond to the requests and indicate whether the requested 5G services are available. The CMM 200 can communicate with other (logical) nodes in the 5G network using the server 301.

The MS provisioning module 302 can arrange resources for carrying out mobility procedures (such as reselection, redirection, aggregation, handover, neighboring cell signal measurement, and so on) for the devices availing the 5G services. In an example, consider that a device intends to avail a 5G service. The MS provisioning module 302 can provide information on how the 5G service can be provided and the amount of network resources that will be required to provide the 5G service.

The ML/AI engine 303 can perform closed loop control learning. The ML/AI engine 303 can track and learn the behavior of the devices and network elements while implementing the mobility schemas, associated with particular 5G services, in performing the mobility procedures. The ML/AI engine 303 can predict the behavior of the devices and network elements in availing and providing other types of 5G services. This can aid the CMM 200 to design mobility schemas for the other 5G services that are likely to be availed in the future. The service registration/Heartbeat manager 304 can ensure availability of the CMM 200 node.

The mobility schema storage 305 can store the mobility schemas that have been created and/or updated corresponding to different types of 5G services, which can manage the mobility of the devices availing the 5G services corresponding with the mobility schemas.

The logger 306 provides a logging framework.

FIG. 3 shows units of the CMM 200, but it is to be understood that other embodiments are not limited thereon. In other embodiments of the disclosure, the CMM 200 may include less or more number of units. Further, the labels or names of the units are used only for illustrative purpose and does not limit the scope of the disclosure. One or more units can be combined together to perform same or substantially similar function in the CMM 200.

Figure 4:
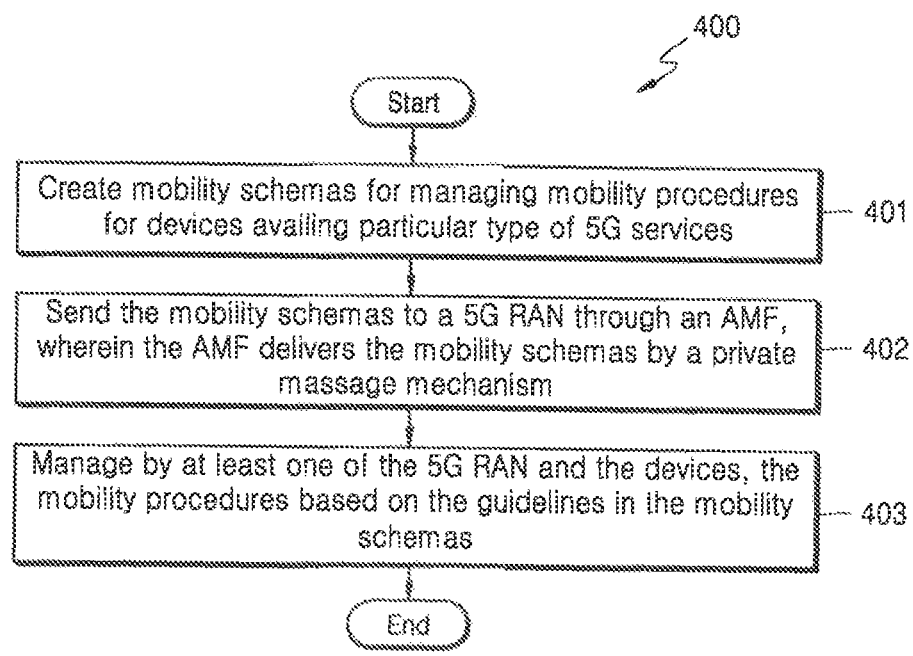
FIG. 4 is a flowchart depicting a method for managing mobility procedures for devices availing 5G services according to an embodiment of the disclosure.

FIG. 4 is a flowchart depicting a method for managing mobility procedures for devices availing 5G services according to an embodiment of the disclosure.

Referring to FIG. 4, at operation 401, the method includes creating at least one mobility schemas for managing mobility procedures for devices availing a particular type of 5G service. The mobility schemas may include guidelines that can direct the management of the mobility procedures, such as cell reselection, cell redirection, neighboring signal cell measurement event, location update, carrier aggregation, Wi-Fi aggregation, handover, and so on.

The mobility schemas can correspond to 5G services that the devices intend to avail through network slices. The mobility schemas can govern the mobility procedures, through guidelines, for the devices intending to avail the 5G services that the mobility schemas correspond to. The guidelines include permission to perform the mobility procedures, allowed frequencies, a list of TAs from which the devices can avail the 5G services, list of preferred cells that can act as neighboring cells, type of RATs the devices can access to avail the 5G services, and so on.

The embodiments include segregating radio resources amongst network slices providing the different types of 5G services. The devices that are availing the 5G services can be provided through a common network slice can randomly access the resources allocated to the network slice. The devices can be identified based on network slice IDs of the network slices through which the devices are availing the 5G services.

At operation 402, the method includes sending the mobility schemas to a 5G RAN 202 through the AMF 201, wherein the AMF 201 can send the mobility schemas to the 5G RAN 202 using a private message mechanism (as defined in the 3GPP specification). The devices can indicate respective intentions to avail specific 5G services to the 5G RAN 202 using registration request messages. The registration request messages can include the capabilities of the devices. The embodiments include requesting information about network slices through which the intended 5G services are provided. Once the information about the network slices are obtained, the embodiments include selecting the network slices that are providing the intended 5G services. The embodiments include obtaining the mobility schemas that have been created for managing the mobility procedures of the devices. The embodiments include dynamically updating the mobility schemas based on capabilities of the plurality of devices and the NSSAI, which are provided by the AMF 201 to the CMM 200. The guidelines can be updated based on requirements of the plurality of 5G services that are being availed by the devices. At operation 403, the method includes managing by at least one of the 5G RAN 202 and the devices, the mobility procedures based on the guidelines in the mobility schemas.

The various actions in a flowchart 400 may be performed in the order presented, in a different order, or simultaneously. Further, in some embodiments of the disclosure, some actions listed in FIG. 4 may be omitted.

Figure 5:
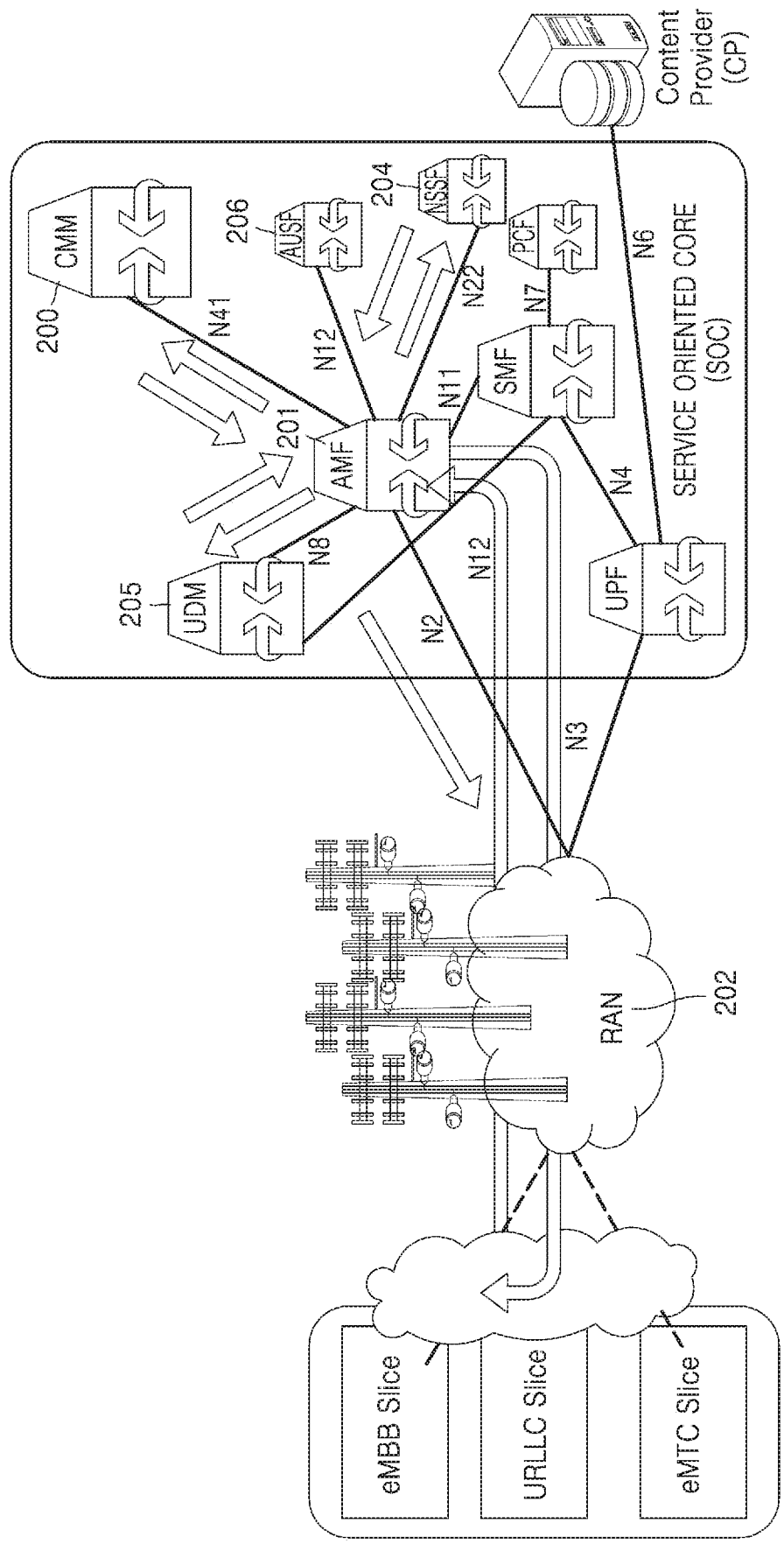
FIG. 5 depicts a flow of information between devices, availing different types of 5G services, and a 5G core network, through a 5G Random Access Network (RAN) according to an embodiment of the disclosure.

FIG. 5 depicts a flow of information between devices, availing different types of 5G services, and a 5G core network, through a 5G RAN according to an embodiment of the disclosure.

Referring to FIG. 5, the CMM 200 can be included in the 5G core network. The CMM 200 can support a seamless user experience with quality, continuity, and scalability, using different mobility schemas that govern the mobility policies of the devices based on the types of 5G services being availed by the devices. In an example, the types of 5G services that can be availed by the devices are eMBB service, URLLC service, and mMTC service. Each 5G services can be availed using a respective network slice, and can have different characteristics and requirements for their enablement, particularly in terms of mobility, latency, and reliability. It is described in the following figures. The CMM 200 comprises of mobility schemas that are specific to the 5G services availed through the network slices. The mobility schemas can be flexible and can be dynamically updated at runtime. The CMM 200 can be connected to management entities in the 5G network for managing the mobility schemas for each network slice. The CMM 200 can be connected to the AMF 201. The AMF 201 can provide the mobility schemas to the 5G RAN 202. Initially, the devices, desiring to avail a particular type of 5G service, can send registration requests to the AMF 201 through the 5G RAN 202, comprising of a plurality of base stations. The registration requests can include information about the type of 5G services that the devices intend to avail and the capabilities of the devices. The information includes registration type (initial registration, mobility registration, periodic registration, emergency registration), user identity (5G Globally Unique Temporary Identity (GUTI), Subscription Permanent Identifier (SUPI), Permanent Equipment Identifier (PEI), or 5G GUTI derived from 4G GUTI for internetworking), a list of visited Tracking Area Identities (TAIs), security capability of the devices (integrity and encryption methods supported by the devices), requested NSSAI (preferred NSSAI on which the devices may intend to camp on), default NSSAI indication (indicates whether the AMF 201 can select the default NSSAI if a requested NSSAI is not available), Protocol Data. Unit (PDU) session status (previously connected PDU sessions under previous Public Land Mobile Network (PLMN)), a list of PDU sessions to be activated (will be included if there is pending uplink traffic belonging to previous PDU sessions), virtual TAI, and so on. On receiving the registration requests, the AMF 201 can request a Unified Data Management (UDM) 205 for information about the network slices through which the 5G services, intended by the devices, can be provided. The information includes mobility subscription data (retrieved by the AMF 201), Session Management Function (SMF) selection data, device context in SMF data, and so on. The UDM 205 can send a response including the information about the network slices through which the intended 5G services can be availed by the devices. The AMF 201 can send a request to a NSSF 204 for indicating the NSSF 204 about the network slices that the AMF 201 intends to select, in order to facilitate the devices to avail the intended 5G services through the selected network slices. The selection of network slices can be based on the type of service that is intended by the devices, as a particular 5G service can be availed through a particular network slice. The AMF 201 can share the capabilities of the devices and NSSAI with the NSSF. The NSSF can send a response that allows the selection of the network slices.

Thereafter, the AMF 201 can request the CMM 200 for mobility schema that is created specifically for the selected network slices. The AMF 201 can provide the capability of the devices and the NSSAI to the CMM 200. Based on the device capability and NSSAI, the CMM 200 may modify the mobility schemas that have been previously created for the selected network slices. The CMM 200 can provide the mobility schemas to the AMF 201 through NSSF 204. The AMF 201 can, thereafter, share the mobility schemas with the RAN 202. The RAN 202 can send the mobility schemas to the devices using a registration accept message. Based on the mobility schemas, the mobility procedures of the devices availing the different 5G services can be controlled. The embodiments include segregating radio resources amongst the network slices for managing the mobility procedures for the devices availing the 5G services through the network slices. The RAN 202 can map radio resources and mobility parameters (such as, but not limited to, reselection parameters, mobility objects, RACH parameters, measurement events, and so on) based on the mobility schemas created for each of the network slices. This allows the 5G network to save uplink radio resources, reduce contentions and downlink resource blockages. If the device intends to receive multiple 5G services through multiple network slices simultaneously, the CMM 200 may prioritize a mobility schema created for one of the intended 5G services. In an example, URLLC services may be prioritized over eMBB services. The mobility procedures of the devices, intending to receive both URLLC and eMBB services, can be managed based on the mobility schema created for the URLLC service. In an embodiment of the disclosure, the CMM 200 can determine the type of 5G service being availed by a device. Consider that the CMM 200 detects that the device is availing a service categorized under mMTC service. The device may initially request the 5G network to allocate an Internet Protocol (IP) address to allow the device to connect with the 5G network. The 5G network can authenticate the device and the device is connected using IP Packet Data Network (PDN) attach. The CMM 200 can determine that the device may not require IP resources continuously based on the nature of service being availed by the device (as the CMM 200 can differentiate between the types of services being availed). The CMM can obtain a device context (determine whether the device is engaged in a procedure that requires IP resources) and based on the context can direct the network to detach the IP PDN connection and perform a re-attach procedure using non-IP PDN. The device can connect with the network using control channel. However, if the device needs to upload data of size exceeding that of the data buffer of the control channel, the CMM 200 can direct the network to perform IP PDN attach.

Figure 6:
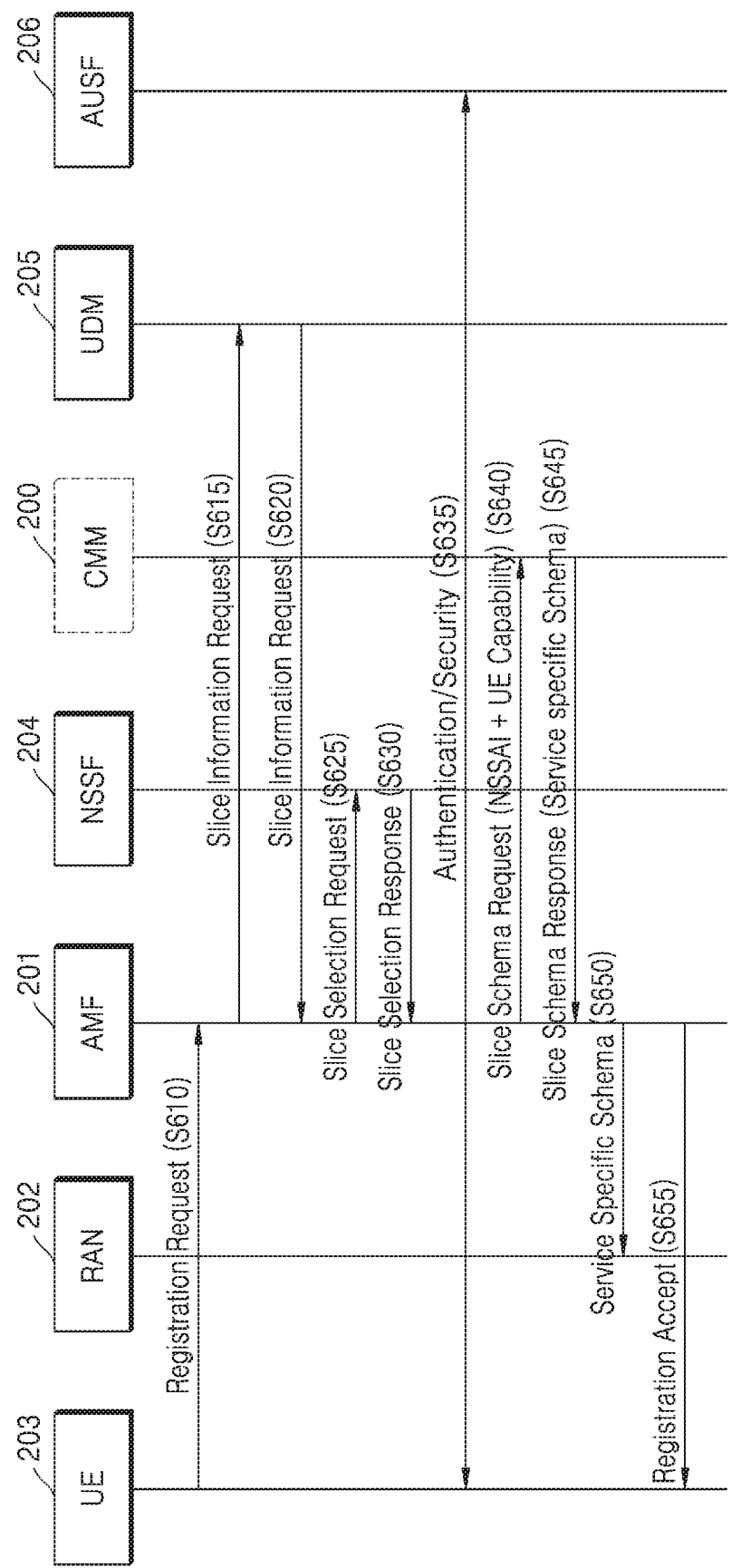
FIG. 6 illustrates schematic flowchart of a method for managing mobility of a device by entities in a core network according to an embodiment of the disclosure.

FIG. 6 illustrates schematic flowchart of a method for managing mobility of a device by entities in a core network according to an embodiment of the disclosure.

Since the description has been described above with FIG. 5, the description thereof will be omitted.

Referring to FIG. 6, at operation S610, a device 203 may transmit registration requests to the AMF 201.

At operation S615, the AMF 201 may transmit a slice information request to UDM 205 requesting information about the slice information. At operation S620, the UDM 205 may transmit a response including the information about the network slices to the AMF 201.

At operation S625, the AMF 201 may transmit a slice selection request to the NSSF 204. At operation S630, the NSSF 204 may transmit a slice selection response to the AMF 201.

At operation S635, AUSF 206 may authenticate the device 203.

At operation S640, the AMF 201 may transmit slice schema request to the CMM 200. More precisely, the AMF 201 may request the CMM 200 for mobility schema that is created specifically for the selected network slices. The AMF 201 may provide the capability of the device and the NSSAI to the CMM 200. After, the CMM 200 may obtain the mobility schemas.

At operation S645, the CMM 200 may transmit slice schema response. More precisely, the CMM 200 may transmit the mobility schema to the AMF 201. The mobility schema may correspond to service specific schema.

At operation S650, the AMF 201 may transmit the mobility schema to the RAN 202.

At operation S655, the RAN 202 may transmit the mobility schema to the device 203 using a registration accept message. Thereafter, the mobility procedures of the devices 203 may be controlled based on the mobility schemas.

Figure 7:
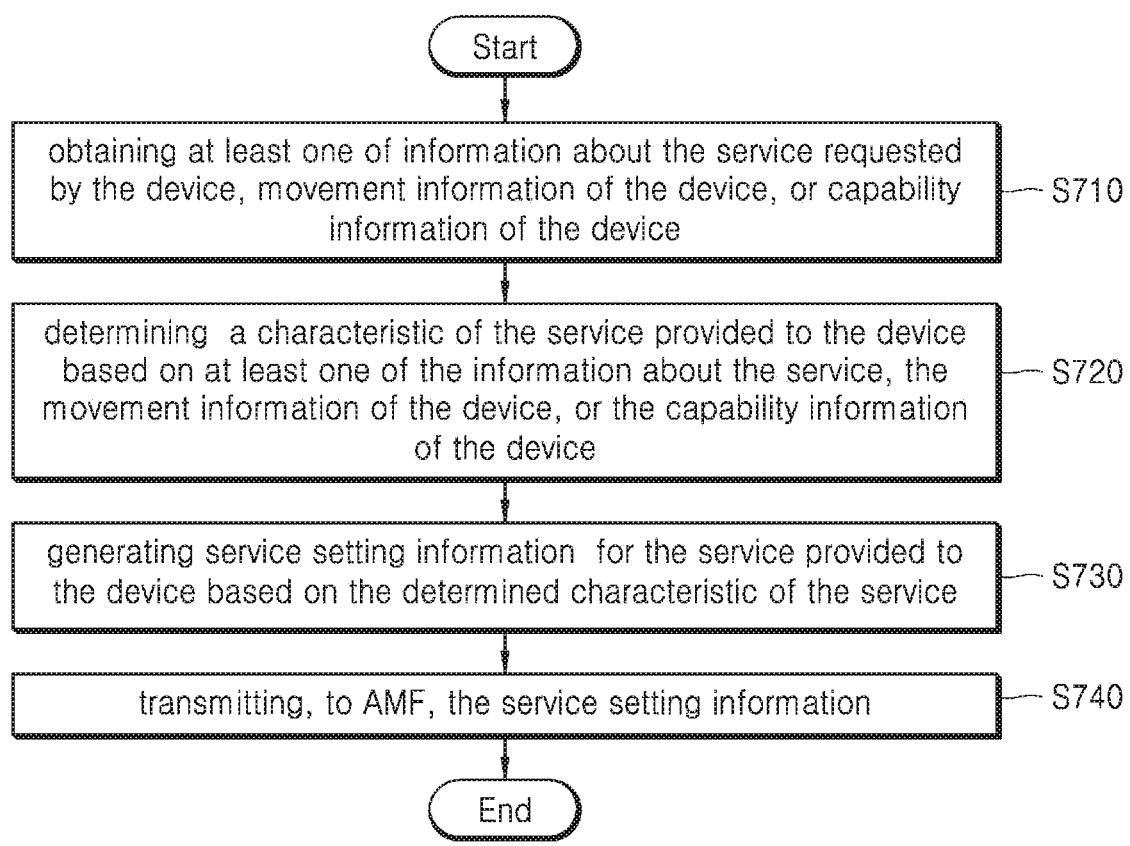
FIG. 7 illustrates schematic flowchart of a method for managing mobility of a CMM according to an embodiment of the disclosure.

FIG. 7 illustrates schematic flowchart of a method for managing mobility of a CMM according to an embodiment of the disclosure.

More specifically, FIG. 7 is a flow chart illustrating a method of controlling, by a CMM (Central Mobility Manager) 200, an operation of a device based on a service provided to the device 203. The service may be provided to the device 203 through a particular network slice. For example, each service may correspond to each network slice.

For example, service may be categorized as eMBB services, mMTC services, URLLC services, and so on. However, the service is not limited to the above example.

Referring to FIG. 7, at operation S710, the CMM 200 may obtain at least one of information about the service requested by the device, movement information of the device, or capability information of the device.

In an embodiment of the disclosure, the information about the service requested by the device may comprise Network Slice Selection and Assistance Information (NSSAI).

In an embodiment of the disclosure, the movement information of the device may comprise at least one of source information of the device, destination information of the device, current location information of the device, or movement route of the device.

In an embodiment of the disclosure, the CMM 200 may obtain current location information of the device, which can be polled by a Location-based Server (LBS) while availing the Vehicle-to-Everything (V2X) service. The CMM 200 may also obtain additional parameters, such as cell ID, TA, frequency of radio nodes (base stations) in the network, and so on.

At operation S720, the CMM 200 may determine a characteristic of the service provided to the device based on at least one of the information about the service, the movement information of the device, or the capability information of the device.

In an embodiment of the disclosure, the CMM 200 may predict an amount of movement of the device 203 according to the characteristics of the service. For example, if the service requested by the device is a URLLC service, the CMM 200 may predict that the amount of movement of the device 203 is large. As another example, if the service requested by the device is a mMTC service, the CMM 200 may predict that the amount of movement of the device 203 is small (stationary).

At operation S730, the CMM 200 may generate service setting information for the service provided to the device based on the determined characteristic of the service.

In an embodiment of the disclosure, the service setting information includes at least one of information of mobility procedure, information about whether to permit the mobility procedure for the device, allowed frequencies for the device, a list of Tracking Areas (TAs) of the device, a list of preferred cells (that act as neighboring cells) of the device, or type of Radio Access Technologies (RATs) of the device.

In the disclosure, the service setting information may comprise Schema, mobility schemas, URLLC schema, mMTC schema, guideline and so on.

In an embodiment of the disclosure, the information of mobility procedure may be generated based on the movement information of the device when the service requested by the device is provided to the device through a network slice. For example, the information of mobility procedure includes at least one of cell reselection, cell redirection, neighboring signal cell measurement event, location update, carrier aggregation, Wireless Fidelity (Wi-Fi) aggregation, or handover for the device.

In an embodiment of the disclosure, the information of mobility procedure may comprise information on whether to perform the above-described operation. For example, if the device 203 requests the mMTC service, the CMM 200 may determine not to perform a handover for the device 203.

In an embodiment of the disclosure, the information of mobility procedure may comprise information on how to perform the above-described operation. For example, if the device 203 requests the mMTC service, the CMM 200 may select the cell among the preferred TA list to update location of the device 203. For example, if the device 203 requests the URLLC service, the CMM 200 may determine the TA list according to the location information of the device 203 to perform handover for the device 203. In addition, the CMM 200 may determine a cell that performs handover among the cells included in the TA list.

In an embodiment of the disclosure, the CMM 200 may receive current location information of the device which the service is provided. In addition, the CMM 200 may determine a cell to perform cell reselection or handover for the device from among the cells included in a list of TAs or a list of preferred cells based on the current location information. In addition, the CMM 200 may generate the service setting information based on the determination.

In an embodiment of the disclosure, the CMM 200 may generate the service configuration information by further considering the capability information of the device 203 and Network Slice Selection and Assistance Information (NSSAI) of the device 203 which are received from the AMF 201.

In an embodiment of the disclosure, the service setting information is generated by further considering the radiation pattern of the radio cell by the CMM 200.

For example, the CMM 200 may provide a TA list and a preferred neighbor list based on at least one of source information of the device, destination information of the device, current location information of the device, movement route of the device or the radiation pattern of radio cells to the RAN 202. If a location update needs to be performed, cell reselection or handover can be performed amongst cells in the TA list and the preferred neighbor list. This can usage of resources for paging and providing location updates.

In an embodiment of the disclosure, the CMM 200 may determine a list of TAs of the device based on the predicted amount of movement. In addition, the CMM 200 may generate the service setting information based on the determined list of TAs. For example, the CMM 200 may allow the device 203 to update its location by switching to a cell that is one amongst a preferred Tracking Area (TA) list. This can avoid frequent updates in the TA, especially if the amount of movement of the device 203 is small.

At operation S740, the CMM 200 may transmit, to AMF 201, the service setting information In an embodiment of the disclosure, the CMM 200 may transmit the service setting information through a message of a predetermined format corresponding to the characteristic of the service. In an embodiment of the disclosure, the CMM 200 may transmit the service setting information by the private message mechanism.

Figure 8:
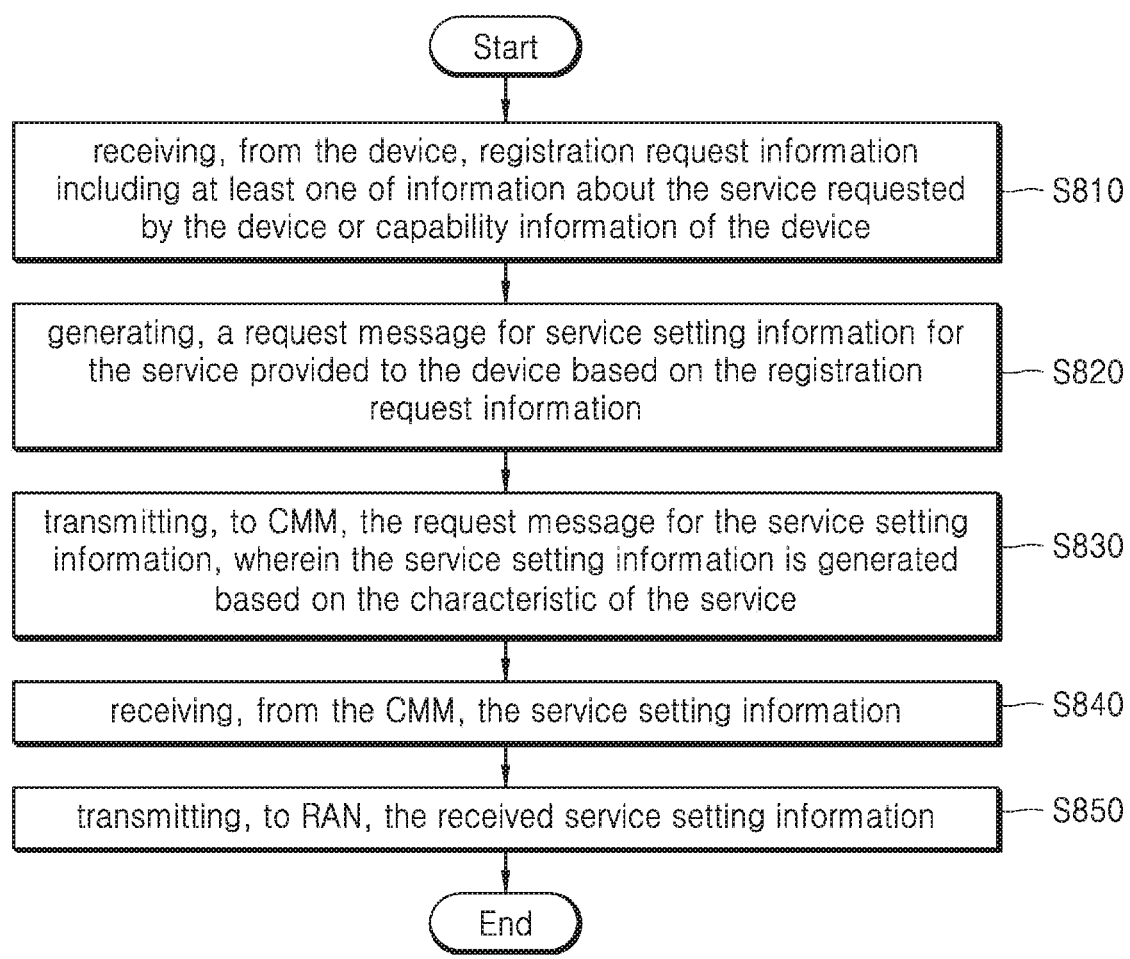
FIG. 8 illustrates schematic flowchart of a method for managing mobility of an AMF according to an embodiment of the disclosure.

FIG. 8 illustrates schematic flowchart of a method for managing mobility of an AMF according to an embodiment of the disclosure.

More specifically, FIG. 8 is a flow chart illustrating a method of controlling, by AMF (Access and Mobility Function) 201, an operation of a device 203 based on a service provided to the device 203, the method comprising:

Referring to FIG. 8, at operation S810, the AMF 201 may receive from the device, registration request information including at least one of information about the service requested by the device or capability information of the device.

Operation S810 may correspond to operation S610 described above.

In an embodiment of the disclosure, the information about the service requested by the device may comprise Network Slice Selection and Assistance Information (NSSAI).

In the disclosure, registration request information may correspond to registration requests.

At operation S820, the AMF 201 may generate, a request message for service setting information for the service provided to the device based on the registration request information.

Operation S820 may correspond to operations S615, S620, S625 and S630 described above.

In an embodiment of the disclosure, the service setting information may comprise at least one of information of mobility procedure, information about whether to permit the mobility procedure for the device, allowed frequencies for the device, a list of Tracking Areas (TAs) of the device, a list of preferred cells of the device, or type of Radio Access Technologies (RATs) of the device.

In an embodiment of the disclosure, wherein information of mobility procedure may comprise at least one of cell reselection, cell redirection, neighboring signal cell measurement event, location update, carrier aggregation, Wireless Fidelity (Wi-Fi) aggregation, or handover for the device. The information of mobility procedure may be generated based on the movement information of the device when the service requested by the device is provided to the device through a network slice.

At operation S830, the AMF 201 may transmit, to CMM 200, the request message for the service setting information, wherein the service setting information is generated based on the characteristic of the service.

Operation S830 may correspond to operation S640 described above.

At operation S840, the AMF 201 may receive, from the CMM 200, the service setting information.

Operation S840 may correspond to operation S645 described above.

At operation S850, the AMF 201 may transmit, to RAN 202, the received service setting information.

Operation S850 may correspond to operation S650 described above.

The AMF 201 may transmit transmitting the service setting information through a message of a format corresponding to the characteristic of the service. In an embodiment of the disclosure, the AMF 201 may transmit the service setting information by the private message mechanism.

Figure 9:
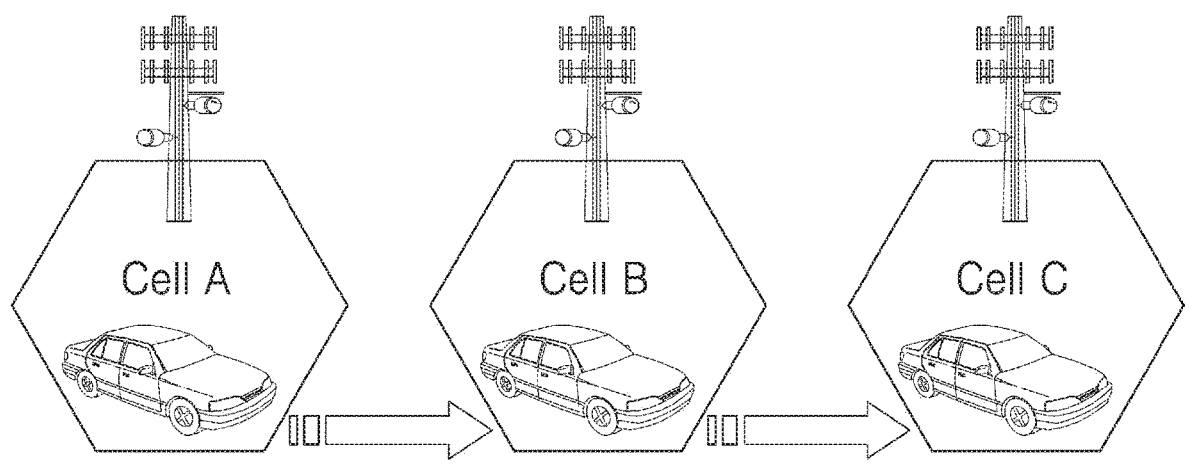
FIG. 9 illustrates a method of controlling an operation of a device based on an Ultra Reliable Low Latency Communication (URLLC) service provided to the device according to an embodiment of the disclosure.

FIG. 9 illustrates a method of controlling an operation of a device based on a URLLC service provided to the device according to an embodiment of the disclosure.

Referring to FIG. 9, the device 203 may move a cell A to a cell C. In an embodiment of the disclosure, the device 203 may be a vehicle.

According to legacy procedure, large neighbor list should be needed. As the device moves (the cell A to the cell C), the neighbor list, which is information for managing the mobility of the device, is further increased. Therefore, in order to obtain a neighbor list according to the movement of the device, a higher measurement report is required.

However, according to the disclosure, when CMM 200 manage the mobility procedure of the device, a small amount of measurement report is required.

For example, the CMM 200 may generate a fixed neighbor list for a device in the cell A. In addition, since the mobility of the device is managed based on the Preferred Neighbor list of device 203, excessive measurement is not required according to the movement of the device. For example, the CMM 200 may generate an optimized neighbor list for a device provided with a service.

In an embodiment of the disclosure, the device 203 may have URLLC NSSAI. The device 203 may access the network with dedicated RACH resource without any contention (Directional RACH with specific beams).

The device 203 may trigger registration request (registration request information) with NSSAI and device capability The device 203 may feed destination. In addition, the device 203 may select the drive route by user.

CMM 200 may obtain the movement information of the device. For example, the movement information of the device comprises at least one of source information of the device, destination information of the device, current location information of the device, or movement route of the device. In addition, CMM 200 may obtain Network operations data including performances and device distribution specific to drive route.

CMM 200 may learn history mobility pattern on the route of the device 203. In addition, CMM 200 may analyze the mobility pattern on the route of the device 203 and predict the preferred neighbor list for URLLC user (the device 203 which is provided URLLC service) while on drive.

CMM 200 may generate and update service setting information for the service provided to the device. For example, CMM 200 may update TA list and optimize the Neighbor list of cells in route (e.g., A URLLC Mobility Schema is for URLLC service).

FIG. 10 illustrates a mobility schema of a device based on a URLLC service according to an embodiment of the disclosure.

More specifically, FIG. 10 is an example for the service setting information (e.g., mobility schema) for the URLLC service provided to the device 203 based on the determined characteristic of the URLLC service. In this case, CMM 200 may obtain information about the URLLC service requested by the device.

Referring to FIG. 10, Proposed URLLC Schema may comprise information which is determined based on the determined characteristic of the URLLC service. For example, URLLC Schema may comprise at least one information of Service type, supported features, EPS attach, RAT-Type supported, serviceAreaRestrictions, RfspIndex, Preferred Neighbor List and so one. However, the information is not limited to the information of FIG. 10.

For example, supported features may include URLLC features (Beam Tracking, beam management, one of the like). For example, EPS attach may be Attach with IP. For example, RAT-Type supported may be NR. For example, serviceAreaRestrictions may be virtual TAL (relation between TAL1, TAL2, TAL3, enroute). For example, RfspIndex may be n78. For example, Preferred Neighbor List may dynamic preferred NL (to avoid measurement event).

However, FIG. 10 is an example for describing the mobility schema of the disclosure, and is not limited to the information of FIG. 10 when the service is URLLC.

Figure 11A:
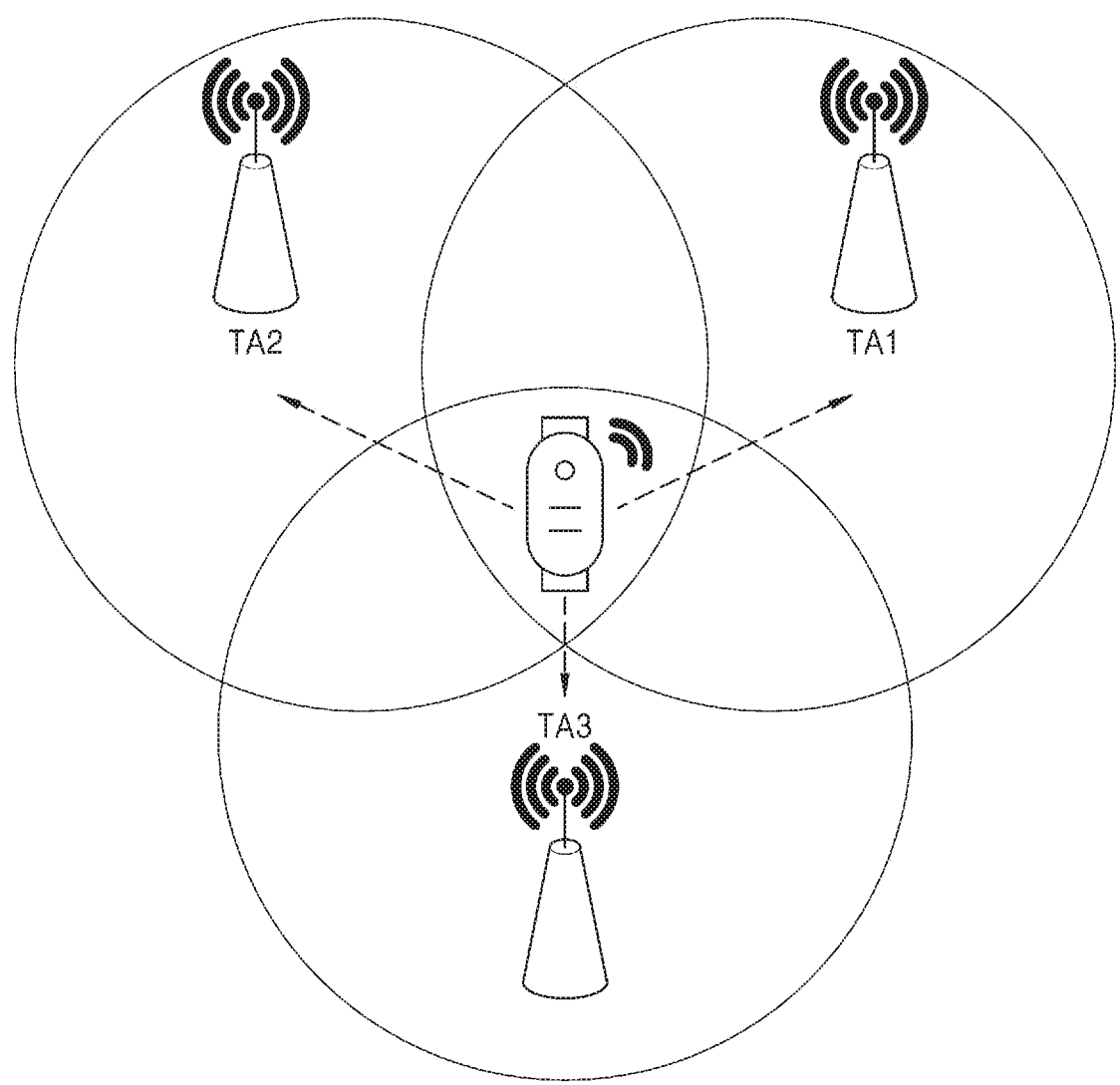
FIG. 11A illustrates a method of controlling an operation of a device based on legacy procedure according to an embodiment of the disclosure.

FIG. 11A illustrates a method of controlling an operation of a device based on a mMTC service provided to the device according to an embodiment of the disclosure.

Referring to FIG. 11A, legacy procedure may be described. For the device 203 located in the border cell, Frequent TAU is required. In addition, higher reselection latency occurs.

Figure 11B:
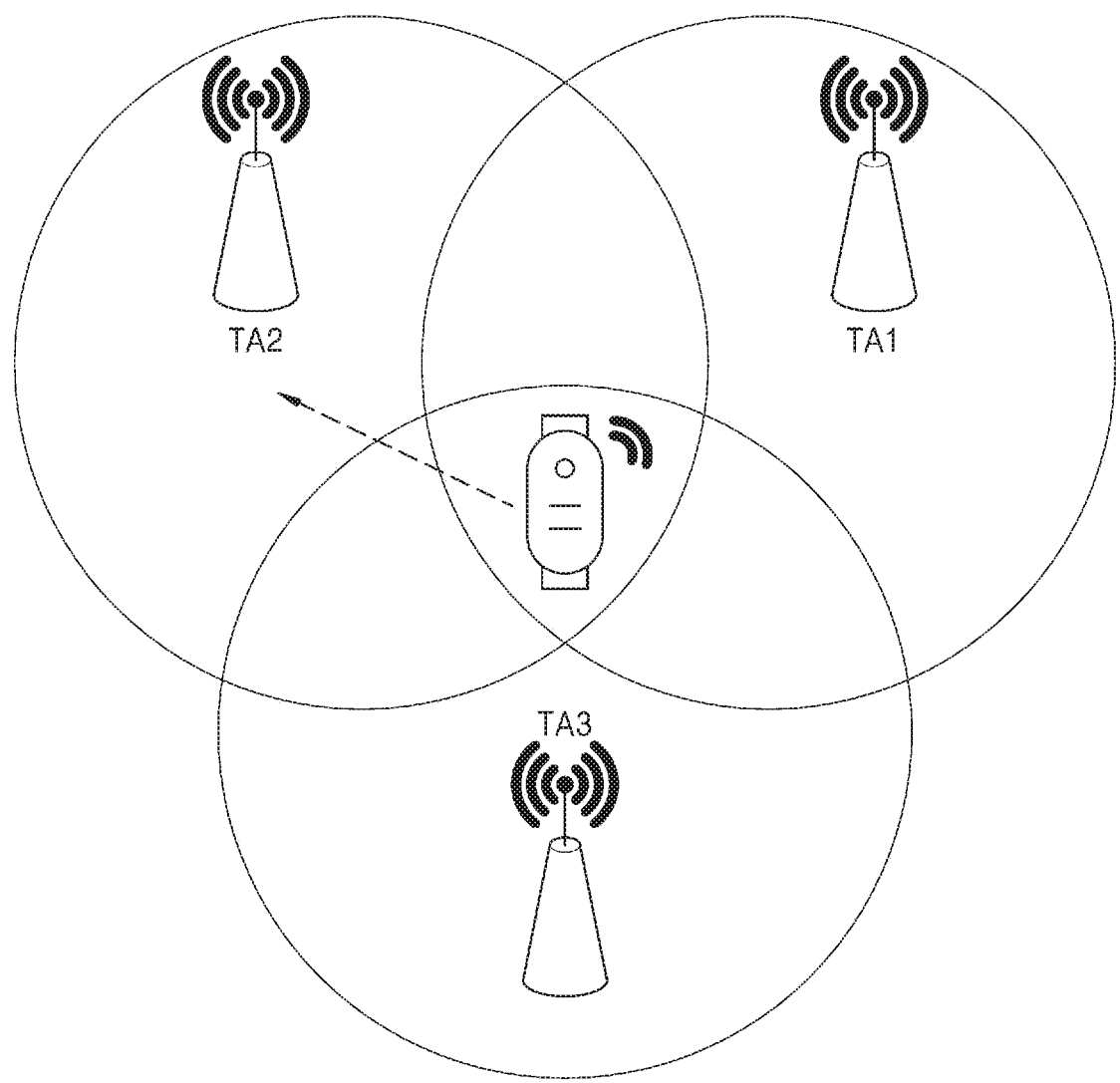
FIG. 11B illustrates a method of controlling an operation of a device based on a massive Machine Type Communication (mMTC) service provided to the device according to an embodiment of the disclosure.

FIG. 11B illustrates a method of controlling an operation of a device based on a mMTC service provided to the device according to an embodiment of the disclosure.

Referring to FIG. 11B, the disclosure may be described. The device 203 may be aware of the best neighbor cell. No frequent measurements performed. In addition, Low reselection latency occurs. TAU is not required.

In addition, CIoT EPS optimization by the device 203 re-attach with "non IP PDN attach" after sending explicit "detach with reattach required" from the device 203 if the data buffer is empty for step size of time like 5 m, 10 m, 15 m, 30 m. According to the disclosure, the PDN, AMF capacity and IP resource may be saved. It helps to enhance the battery life of CIoT device.

In an embodiment of the disclosure, the device 203 may have mMTC NSSAI. The device 203 may access the network with dedicated RACH resource without any contention (Directional RACH with specific beams).

The device 203 may trigger registration request (registration request information) with NSSAI and device capability The CMM 200 may calculate Preferred TA and cell for this identified device 203. In addition, The CMM 200 may avoid the frequent tracking area update for the device 203 and reduce paging delay for mMTC device.

The CMM 200 may obtain above input (information). In addition, The CMM 200 may obtain (fetch) the location of device 203 as per last session or network registration to optimize the schema. For example, in this case (e.g., mMTC device), the CMM 200 may determine that reselection is not necessary for the device 203 requesting this service. The CMM 200 may determine that Redirection is not necessary for the device 203 requesting this service. The CMM 200 may determine that measurement for handover is not necessary for the device 203 requesting this service. The CMM 200 may determine that carrier aggregation is not necessary for the device 203 requesting this service.

The AMF 201 may trigger detach with re-attach (attach without PDN IP), if no data activity.

FIG. 12 illustrates a mobility schema of a device based on a mMTC service according to an embodiment of the disclosure.

More specifically, FIG. 12 is an example for the service setting information (e.g., mobility schema) for the mMTC service provided to the device 203 based on the determined characteristic of the mMTC service. In this case, CMM 200 may obtain information about the mMTC service requested by the device.

Referring to FIG. 12, proposed mMTC Schema may comprise information which is determined based on the determined characteristic of the mMTC service. For example, mMTC Schema may comprise at least one information of Service type, supported features, EPS attach, RAT-Type supported, serviceAreaRestrictions, RfspIndex, Preferred Neighbor List and so one. However, the information is not limited to the information of FIG. 12.

For example, supported features may include mMTC features (PSM, DRX, SISO, Coverage Extension, Event based Paging, Rate control and so on). For example, EPS attach may be Attach without IP. For example, RAT-Type supported may be NR. For example, serviceAreaRestrictions may be TA1. For example, RfspIndex may be n5, n8. For example, Preferred Neighbor List may be N1, N2, N3, N4.

However, FIG. 12 is an example for describing the mobility schema of the disclosure, and is not limited to the information of FIG. 12 when the service is mMTC.

Figure 13A:
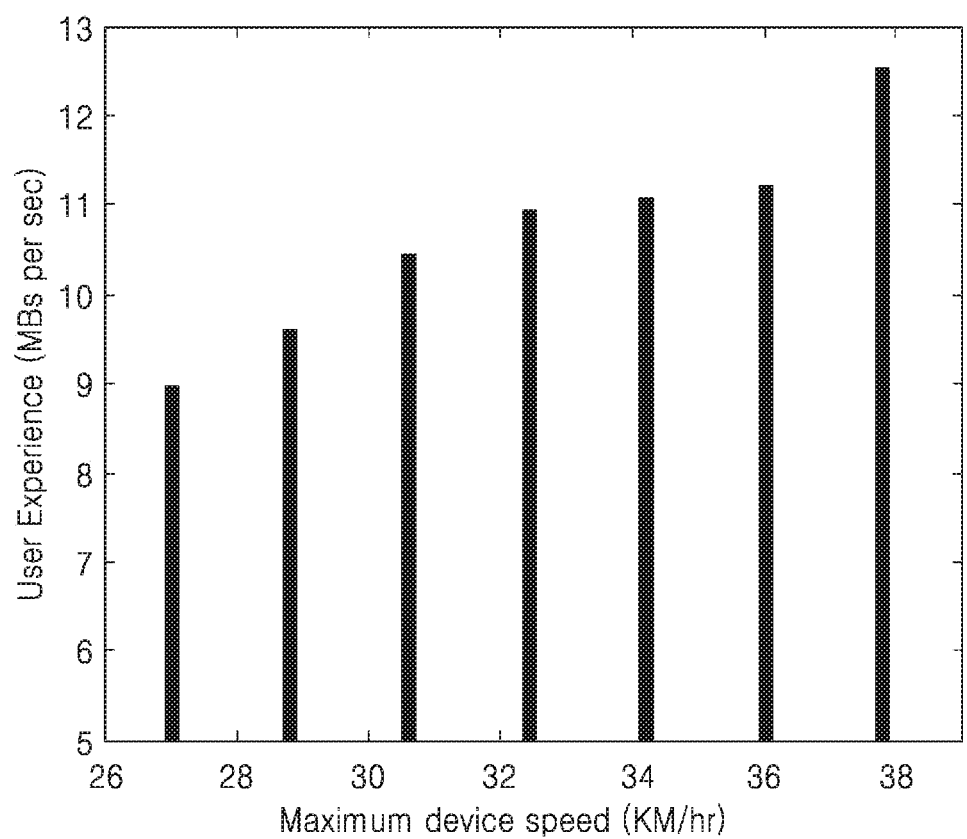
FIG. 13A is a graph depicting a variation of user experience with respect to maximum device speed according to an embodiment of the disclosure.

FIG. 13A is a graph depicting a variation of user experience with respect to maximum device speed according to an embodiment of the disclosure.

In an embodiment of the disclosure, data rate can be used as a measure of user experience. The user experience can be considered as improved, if the data rate increases. The data rate can be measured in Mbps and the maximum device speed can be measured in Km/hr. Consider that the user is availing a 5G service using a device, which is moving at a particular speed.

Referring to FIG. 13A, when the device is moving at a speed of 27 Km/hr, the device can upload/download at least 8.9 MB of data per second more than that of existing mobility management schemes. When the device is moving at a speed of 38 Km/hr, the device can upload/download at least 12.8 MB of data per second more than that of existing mobility management schemes. The above mentioned improvement is attributed due to dedicated mobility schemas for different types of 5G services, wherein devices are segregated based on the type of 5G services availed by the devices and the mobility procedure of the devices is governed by the mobility schemas. This minimizes handover latency during mobility.

Figure 13B:
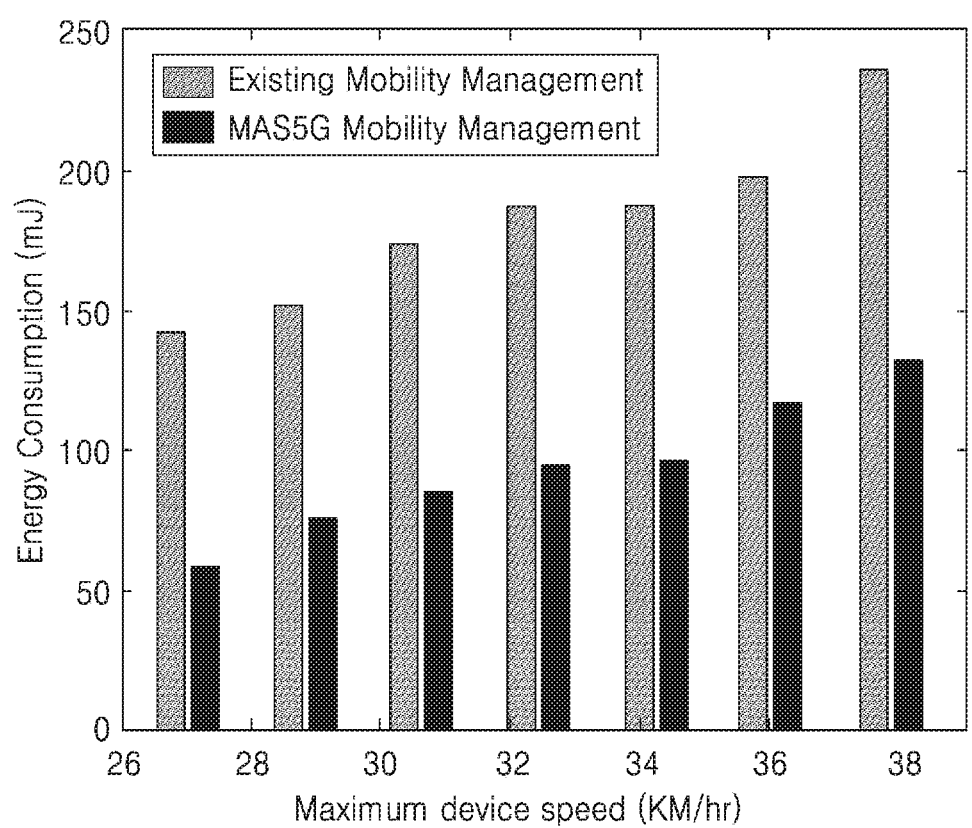
FIG. 13B is a graph depicting a comparison of energy consumption between existing mobility management schemes and CMM based mobility management according to an embodiment of the disclosure.

FIG. 13B is a graph depicting a comparison of energy consumption between existing mobility management schemes and CMM based mobility management according to an embodiment of the disclosure.

Referring to FIG. 13B, the energy consumption is depicted with respect to the maximum device speed. It can be inferred that the speed of the device is proportional to the energy consumption of the device. Using the existing mobility management schemes, the energy consumption is 240 mJ when the device is moving at a speed of 38 km/hr, whereas for CMM 200 based mobility management, the energy consumption is 120 mJ. At a speed of 27 Km/hr, whereas for the CMM 200 based mobility management, the energy consumption is 146 mJ. The energy saving is a result of managing mobility procedures, such as paging, RACH procedure, frequency selection, and specific features, for a device based on mobility schema created for specific 5G services availed by the devices.

Figure 13C:
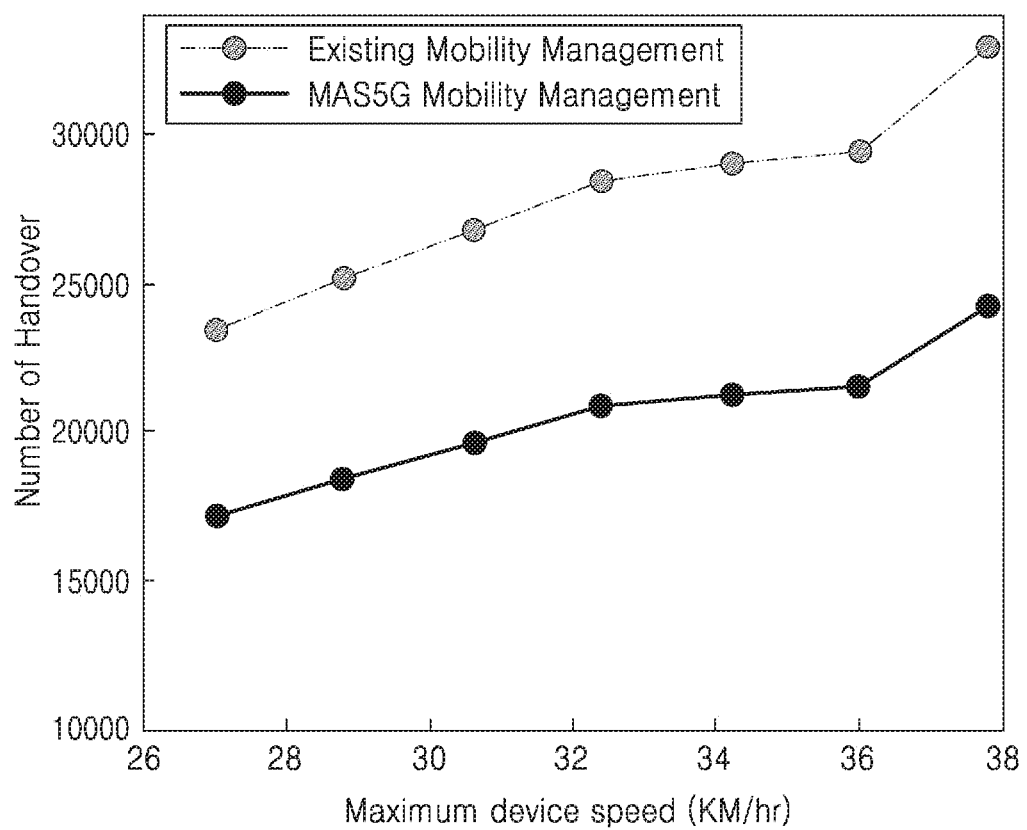
FIG. 13C is a graph depicting a comparison of total number of handovers between existing mobility management schemes and CMM based mobility management according to an embodiment of the disclosure.

FIG. 13C is a graph depicting a comparison of total number of handovers between existing mobility management schemes and CMM based mobility management according to embodiment of the disclosure.

Referring to FIG. 13C, for dense networks, when the speed of movement of devices is about 38 Km/hr, there is a 29.41% decrease in the total number of handovers for the CMM 200 based mobility management as compared to the existing mobility management schemes. For a particular network slice providing a particular category of 5G service, the mobility schemas are specific. The mobility schemas can define the instants at which neighboring cell signal measurement can be performed, frequency of handover, neighboring cells that can act as target cells for handover, and so on. This can reduce unwanted measurements and cell switching event triggers from the devices availing a 5G service through a network slice and prevent contention due to large number of devices contesting for same radio resources.

The embodiments disclosed herein can be implemented through at least one software program running on at least one hardware device and performing network management functions to control the network elements. The network elements shown in FIG. 5 include blocks which can be at least one of a hardware device, or a combination of hardware device and software module.

The embodiments disclosed herein describe methods and systems for managing mobility of devices in 5G networks based on type of 5G services availed by the devices. Therefore, it is understood that the scope of the protection is extended to such a program and in addition to a computer readable means having a message therein, such computer readable storage means contain program code means for implementation of one or more operations of the method, when the program runs on a server or mobile device or any suitable programmable device. The method is implemented in a preferred embodiment through or together with a software program written in e.g., Very high speed integrated circuit Hardware Description Language (VHDL) another programming language, or implemented by one or more VHDL or several software modules being executed on at least one hardware device. The hardware device can be any kind of portable device that can be programmed. The device may also include means which could be e.g., hardware means like e.g., an application-specific integrated circuit (ASIC), or a combination of hardware and software means, e.g., an ASIC and a field-programmable gate array (FPGA), or at least one microprocessor and at least one memory with software modules located therein. The method embodiments described herein could be implemented partly in hardware and partly in software. Alternatively, the disclosure may be implemented on different hardware devices, e.g., using a plurality of central processing units (CPUs).

Figure 14:
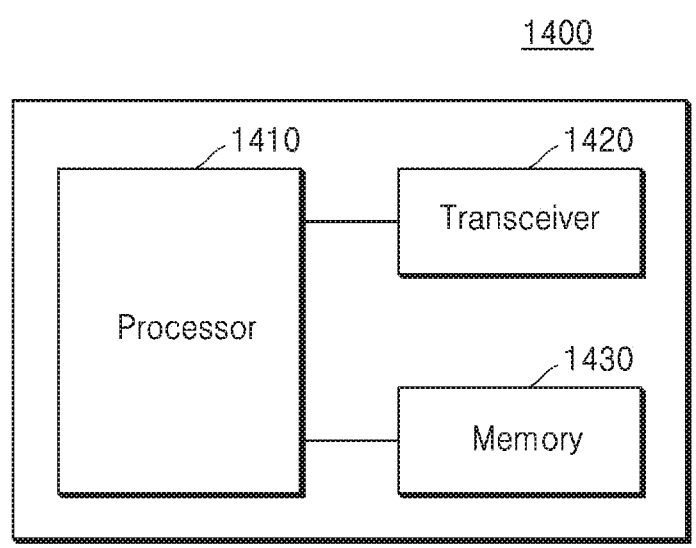
FIG. 14 schematically illustrates a CMM according to an embodiment of the disclosure.

FIG. 14 schematically illustrates a CMM according to an embodiment of the disclosure.

A CMM 1400 corresponds to the CMM 200 of FIG. 2.

Referring to the FIG. 14, the CMM 1400 may include a processor 1410, a transceiver 1420 and a memory 1430. However, all of the illustrated components are not essential. The CMM 1400 may be implemented by more or less components than those illustrated in FIG. 14. In addition, the processor 1410 and the transceiver 1420 and the memory 1430 may be implemented as a single chip according to another embodiment.

The aforementioned components will now be described.

The processor 1410 may include one or more processors or other processing devices that control the proposed function, process, and/or method. Operation of the CMM 1400 may be implemented by the processor 1410.

The transceiver 1420 may include a RF transmitter for up-converting and amplifying a transmitted signal, and a RF receiver for down-converting a frequency of a received signal. However, according to an embodiment of the disclosure, the transceiver 1420 may be implemented by more or less components than those illustrated in components.

The transceiver 1420 may be connected to the processor 1410 and transmit and/or receive a signal. The signal may include control information and data. In addition, the transceiver 1420 may receive the signal through a wireless channel and output the signal to the processor 1410. The transceiver 1420 may transmit a signal output from the processor 1410 through the wireless channel.

The memory 1430 may store the control information or the data included in a signal obtained by the CMM 1400. The memory 1430 may be connected to the processor 1410 and store at least one instruction or a protocol or a parameter for the proposed function, process, and/or method. The memory 1430 may include read-only memory (ROM) and/or random access memory (RAM) and/or hard disk and/or CD-ROM and/or DVD and/or other storage devices.

In an embodiment of the disclosure, the processor 1410 configured to obtain at least one of information about the service requested by the device, movement information of the device, or capability information of the device, determine a characteristic of the service provided to the device based on at least one of the information about the service, the movement information of the device, or the capability information of the device, generate service setting information for the service provided to the device based on the determined characteristic of the service, and transmit, to an AMF (Access and Mobility Function), the service setting information.

In an embodiment of the disclosure, the processor 1410 configured to receive current location information of the device which the service is provided, determine a cell to perform cell reselection or handover for the device from among the cells included in a list of TAs or a list of preferred cells based on the current location information, and generate the service setting information based on the determination.

In an embodiment of the disclosure, the processor 1410 configured to generate the service configuration information by further considering the capability information of the device and Network Slice Selection and Assistance Information (NSSAI) of the device which are received from the AMF.

In an embodiment of the disclosure, the processor 1410 configured to predict an amount of movement of the device according to the characteristics of the service.

In an embodiment of the disclosure, the processor 1410 configured to determine a list of TAs of the device based on the predicted amount of movement, and generating the service setting information based on the determined list of TAs.

In an embodiment of the disclosure, the processor 1410 configured to transmit the service setting information through a message of a format corresponding to the characteristic of the service.

Figure 15:
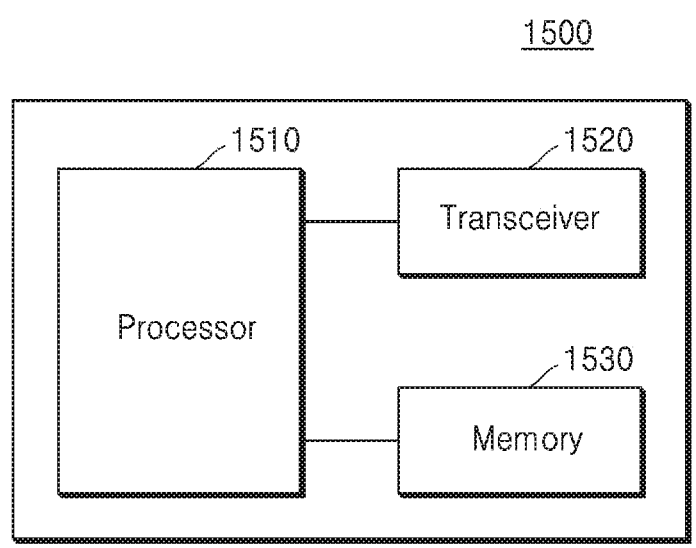
FIG. 15 schematically illustrates an AMF according to an embodiment of the disclosure.

FIG. 15 schematically illustrates an AMF according to an embodiment of the disclosure.

An AMF 1500 corresponds to the AMF 201 of FIG. 2.

Referring to the FIG. 15, an AMF 1500 may include a processor 1510, a transceiver 1520 and a memory 1530. However, all of the illustrated components are not essential. The AMF 1500 may be implemented by more or less components than those illustrated in FIG. 15. In addition, the processor 1510 and the transceiver 1520 and the memory 1530 may be implemented as a single chip according to another embodiment.

The aforementioned components will now be described.

The processor 1510 may include one or more processors or other processing devices that control the proposed function, process, and/or method. Operation of the AMF 1500 may be implemented by the processor 1510.

The transceiver 1520 may include a RF transmitter for up-converting and amplifying a transmitted signal, and a RF receiver for down-converting a frequency of a received signal. However according to an embodiment of the disclosure, the transceiver 1520 may be implemented by more or less components than those illustrated in components.

The transceiver 1520 may be connected to the processor 1510 and transmit and/or receive a signal. The signal may include control information and data. In addition, the transceiver 1520 may receive the signal through a wireless channel and output the signal to the processor 1510. The transceiver 1520 may transmit a signal output from the processor 1510 through the wireless channel.

The memory 1530 may store the control information or the data included in a signal obtained by the AMF 1500. The memory 1530 may be connected to the processor 1510 and store at least one instruction or a protocol or a parameter for the proposed function, process, and/or method. The memory 1530 may include read-only memory (ROM) and/or random access memory (RAM) and/or hard disk and/or CD-ROM and/or DVD and/or other storage devices.

In an embodiment of the disclosure, the processor 1510 configured to receive from the device, registration request information including at least one of information about the service requested by the device or capability information of the device, generate, a request message for service setting information for the service provided to the device based on the registration request information, transmit, to Central Mobility Manager (CMM), the request message for the service setting information, wherein the service setting information is generated based on the characteristic of the service, receive, from the CMM, the service setting information, and transmit, to Random Access Network (RAN), the received service setting information.

In an embodiment of the disclosure, the processor 1510 configured to transmit the service setting information through a message of a format corresponding to the characteristic of the service.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method of controlling, by a Central Mobility Manager (CMM), an operation of a device based on a service provided to the device, the method comprising:
   receiving, from an Access and Mobility Function (AMF), a request to generate information related to mobility for restricting cell switching, the request including at least one of information about the service requested by the device, movement information of the device, or capability information of the device;
   determining a characteristic of the service provided to the device based on at least one of the information about the service, the movement information of the device, or the capability information of the device;
   generating the information related to mobility for restricting cell switching with respect to the service provided to the device based on the determined characteristic of the service and a network slice; and
   transmitting, to the AMF, the information related to mobility for restricting cell switching.

2. The method of claim 1,
   wherein the information about the service requested by the device comprises Network Slice Selection and Assistance Information (NSSAI), and
   wherein the movement information of the device comprises at least one of source information of the device, destination information of the device, current location information of the device, or movement route of the device.

3. The method of claim 1,
   wherein the information related to mobility comprises at least one of information about a mobility procedure, information about whether to permit the mobility procedure for the device, allowed frequencies for the device, a list of Tracking Areas (TAs) of the device, a list of preferred cells of the device, or type of Radio Access Technologies (RATs) of the device.

4. The method of claim 3,
   wherein the information about the mobility procedure comprises at least one of cell reselection, cell redirection, a neighboring signal cell measurement event, a location update, carrier aggregation, Wireless Fidelity (Wi-Fi) aggregation, or handover for the device, and
   wherein the information about the mobility procedure is generated based on the movement information of the device when the service requested by the device is provided to the device through a network slice.

5. The method of claim 1, wherein the generating of the information related to mobility for restricting cell switching with respect to the service provided to the device comprises:
   receiving current location information of the device to which the service is provided,
   determining a cell to perform cell reselection or handover for the device from among the cells included in a list of tracking areas (TAs) or a list of preferred cells based on the current location information, and
   generating the information related to mobility based on the determination.

6. The method of claim 1, wherein the generating of the information related to mobility for restricting cell switching with respect to the service provided to the device comprises:
   generating the information related to mobility by further considering the capability information of the device and Network Slice Selection and Assistance Information (NSSAI) of the device, which are received from the AMF.

7. The method of claim 1, wherein the information related to mobility is generated by further considering a radiation pattern of a radio cell.

8. The method of claim 1,
wherein the determining of the characteristic of the service provided to the device comprises:
predicting an amount of movement of the device according to the characteristic of the service, and
wherein the generating of the information related to mobility for restricting cell switching with respect to the service provided to the device comprises:
determining a list of tracking areas (TAs) of the device based on the predicted amount of movement, and generating the information related to mobility based on the determined list of TAs.

9. The method of claim 1, wherein the transmitting, to the AMF, of the information related to mobility comprises:
transmitting the information related to mobility through a message having a format corresponding to the characteristic of the service.

10. The method of claim 1, further comprising:
predicting an amount of movement of the device based on the determined characteristic of the service,
wherein the information related to mobility for the service provided to the device is generated based on the determined characteristic of the service, the network slice, and the predicted amount of movement.

11. A Central Mobility Manager (CMM) of controlling an operation of a device based on a service provided to the device, the CMM comprising:
a transceiver;
at least one processor; and
a memory configured to store instructions that, when executed by the at least one processor, cause the at least one processor to:
receive, from an Access and Mobility Function (AMF), a request to generate information related to mobility for restricting cell switching, the request including at least one of information about the service requested by the device, movement information of the device, or capability information of the device,
determine a characteristic of the service provided to the device based on at least one of the information about the service, the movement information of the device, or the capability information of the device,
generate the information related to mobility for restricting cell switching with respect to the service provided to the device, based on the determined characteristic of the service and a network slice, and
control the transceiver to transmit, to the AMF, the information related to mobility for restricting cell switching.

12. The CMM of claim 11,
wherein the information about the service requested by the device comprises Network Slice Selection and Assistance Information (NSSAI), and
wherein the movement information of the device comprises at least one of source information of the device, destination information of the device, current location information of the device, or a movement route of the device.

13. The CMM of claim 11,
wherein the information related to mobility comprises at least one of information about a mobility procedure, information about whether to permit the mobility procedure for the device, allowed frequencies for the device, a list of Tracking Areas (TAs) of the device, a list of preferred cells of the device, or type of Radio Access Technologies (RATs) of the device.

14. The CMM of claim 13,
wherein the information about the mobility procedure comprises at least one of cell reselection, cell redirection, neighboring signal cell measurement event, location update, carrier aggregation, Wireless Fidelity (Wi-Fi) aggregation, or handover for the device, and
wherein the information about the mobility procedure is generated based on the movement information of the device when the service requested by the device is provided to the device through a network slice.

15. The CMM of claim 11, wherein the at least one processor is configured to:
control the transceiver to receive current location information of the device to which the service is provided,
determine a cell to perform cell reselection or handover for the device from among the cells included in a list of tracking areas (TAs) or a list of preferred cells based on the current location information, and
generate the information related to mobility based on the determination.

16. The CMM of claim 11, wherein the at least one processor is configured to:
generate the information related to mobility by further considering the capability information of the device and Network Slice Selection and Assistance Information (NSSAI) of the device which are received from the AMF.

* * * * *